(12) United States Patent
Vandenberg

(10) Patent No.: US 10,414,030 B2
(45) Date of Patent: Sep. 17, 2019

(54) TENSION FED FASTENER INSTALLATION TOOL AND RELATED METHODS OF USE

(71) Applicant: National Nail Corp., Grand Rapids, MI (US)

(72) Inventor: Roger A. Vandenberg, Hudsonville, MI (US)

(73) Assignee: National Nail Corp., Grand Rapids, MI (US)

( * ) Notice: Subject to any disclaimer, the term of this patent is extended or adjusted under 35 U.S.C. 154(b) by 198 days.

(21) Appl. No.: 15/430,834

(22) Filed: Feb. 13, 2017

(65) Prior Publication Data
US 2017/0239794 A1   Aug. 24, 2017

Related U.S. Application Data

(60) Provisional application No. 62/399,663, filed on Sep. 26, 2016, provisional application No. 62/297,161, filed on Feb. 19, 2016.

(51) Int. Cl.
*B25B 23/04*    (2006.01)
*B25C 1/00*    (2006.01)
*F16B 27/00*    (2006.01)
*B25B 23/00*    (2006.01)
*B25B 21/00*    (2006.01)

(52) U.S. Cl.
CPC .......... *B25B 23/045* (2013.01); *B25B 21/002* (2013.01); *B25B 23/005* (2013.01); *B25C 1/003* (2013.01); *F16B 27/00* (2013.01)

(58) Field of Classification Search
CPC ... B25B 23/045; B25B 21/002; B25B 23/005; B25B 23/04; B25C 1/003; F16B 27/00
See application file for complete search history.

(56) References Cited

U.S. PATENT DOCUMENTS

| | | | |
|---|---|---|---|
| 1,815,594 | A | 7/1931 | Shaw et al. |
| 3,023,015 | A | 2/1962 | Pankow |
| 3,601,168 | A | 8/1971 | Fernstrom |
| 3,623,646 | A | 11/1971 | Oberlenningen et al. |

(Continued)

FOREIGN PATENT DOCUMENTS

| | | |
|---|---|---|
| DE | 29820104 | 2/1999 |
| DE | 20009191 | 8/2000 |

(Continued)

*Primary Examiner* — Ryan J. Walters
(74) *Attorney, Agent, or Firm* — Warner Norcross + Judd, LLP

(57) ABSTRACT

An installation tool and related methods are provided. The tool can pull a strip of collated fasteners along a collated fastener path to a guide, where individual fasteners are sequentially separated from the strip and advanced into a workpiece. The tool can include a tension feeder located downstream of the guide. The tension feeder is configured to apply tension to the strip between the guide and a leading end of the strip. The tool can include a driveshaft configured to attach to a conventional drive tool chuck or a drive tool having hexagonal type drive components. The guide can be one piece and replaceable, with a guide body and a guide head. A strip slot can be defined in the same to align a fastener head with a backstop and facilitate entry of a fastener shank in a feed slot. Related methods of use are provided.

7 Claims, 25 Drawing Sheets

(56) References Cited

U.S. PATENT DOCUMENTS

| | | |
|---|---|---|
| 3,892,313 A | 7/1975 | Lange |
| 3,982,678 A | 9/1976 | Olson |
| 4,014,488 A | 3/1977 | Potucek et al. |
| 4,018,254 A | 4/1977 | DeCaro |
| 4,062,388 A | 12/1977 | DeCaro |
| 4,146,071 A | 3/1979 | Mueller et al. |
| 4,167,229 A | 9/1979 | Keusch et al. |
| 4,367,837 A | 1/1983 | Manino |
| 4,404,877 A | 9/1983 | Mizuno et al. |
| 4,428,261 A | 1/1984 | Takatsu et al. |
| 4,475,726 A | 10/1984 | Smith |
| 4,512,693 A | 4/1985 | Swanson |
| 4,625,597 A | 12/1986 | Cast |
| 4,674,367 A | 6/1987 | Aab et al. |
| 4,774,863 A | 10/1988 | Geist |
| 4,775,089 A | 10/1988 | MacDonald |
| 4,784,026 A | 11/1988 | Kobayashi et al. |
| 4,821,877 A | 4/1989 | Aab et al. |
| 4,930,630 A | 6/1990 | Habermehl |
| 5,027,679 A | 7/1991 | Kawashima et al. |
| 5,083,483 A | 1/1992 | Takagi |
| 5,109,738 A | 5/1992 | Farian et al. |
| 5,134,909 A | 8/1992 | Sasaki |
| 5,144,870 A | 9/1992 | Nick |
| 5,167,174 A | 12/1992 | Fujiyama et al. |
| 5,184,497 A | 2/1993 | Hanlon et al. |
| 5,219,110 A | 6/1993 | Mukoyama |
| 5,231,900 A | 8/1993 | Deri |
| 5,238,168 A | 8/1993 | Oda |
| 5,267,682 A | 12/1993 | Okouchi |
| 5,284,074 A | 2/1994 | Chen |
| 5,303,620 A | 4/1994 | Payne et al. |
| 5,322,189 A | 6/1994 | Oda |
| 5,337,635 A | 8/1994 | Habermehl |
| 5,337,636 A | 8/1994 | Shea |
| 5,354,304 A | 10/1994 | Allen et al. |
| 5,470,180 A | 11/1995 | Jore |
| 5,473,965 A | 12/1995 | Chen |
| 5,568,753 A | 10/1996 | Habermehl et al. |
| 5,687,624 A | 11/1997 | Tsuge et al. |
| 5,715,982 A | 2/1998 | Adachi |
| 5,771,516 A | 6/1998 | Huang |
| 5,772,096 A | 6/1998 | Osuka et al. |
| 5,799,856 A | 9/1998 | Mukoyama |
| 5,810,239 A | 9/1998 | Stich |
| 5,904,079 A | 5/1999 | Tsuge et al. |
| 5,947,210 A | 9/1999 | Susaki et al. |
| 5,947,362 A | 9/1999 | Omli |
| 5,954,463 A | 9/1999 | Jore |
| 5,957,634 A | 9/1999 | Carpinetti |
| 5,974,918 A | 11/1999 | Nakagawa et al. |
| 5,988,026 A | 11/1999 | Reckelhoff et al. |
| 5,993,454 A | 11/1999 | Longo |
| 6,016,946 A | 1/2000 | Phillips et al. |
| 6,045,024 A | 4/2000 | Phillips |
| 6,055,891 A | 5/2000 | Habermehl |
| 6,062,113 A | 5/2000 | Nakano et al. |
| 6,089,132 A | 7/2000 | Habermehl |
| 6,089,331 A | 7/2000 | Christ |
| 6,098,442 A | 8/2000 | Walldorf et al. |
| 6,131,434 A | 10/2000 | Schneider, Jr. |
| 6,145,725 A | 11/2000 | Omli |
| 6,155,139 A | 12/2000 | Tanji |
| 6,158,643 A | 12/2000 | Phillips |
| 6,179,192 B1 | 1/2001 | Weinger et al. |
| 6,230,594 B1 | 5/2001 | Jalbert et al. |
| 6,244,140 B1 | 6/2001 | Habermehl |
| 6,354,177 B2 | 3/2002 | Peters |
| 6,478,209 B1 | 11/2002 | Bruins et al. |
| 6,511,268 B1 | 1/2003 | Vasudeva et al. |
| 6,523,658 B2 | 2/2003 | Furuta et al. |
| 6,536,537 B1 | 3/2003 | Sasaki et al. |
| 6,668,941 B2 | 12/2003 | Phillips et al. |
| 6,676,001 B1 | 1/2004 | Chen et al. |
| 6,761,361 B2 | 7/2004 | Taylor et al. |
| 6,779,700 B2 | 8/2004 | Bruins et al. |
| 6,814,231 B2 | 11/2004 | Gupta |
| 6,892,921 B2 | 5/2005 | Beville |
| 6,966,562 B1 | 11/2005 | Wienhold |
| 6,968,945 B2 | 11/2005 | Bruins et al. |
| 7,032,482 B1 | 4/2006 | Hoffman |
| 7,207,095 B2 | 4/2007 | Bruins et al. |
| 7,290,470 B1 | 11/2007 | Peters |
| 7,344,058 B2 | 3/2008 | Bruins et al. |
| 7,401,659 B2 | 7/2008 | Hsu |
| 7,481,346 B2 | 1/2009 | Vanden Berg et al. |
| 7,487,699 B2 | 2/2009 | Xu |
| 7,594,456 B2 | 2/2009 | Hauber et al. |
| 7,530,483 B2 | 5/2009 | Bruins et al. |
| 7,661,340 B2 | 2/2010 | Xu |
| 7,836,970 B2 | 11/2010 | Bruins et al. |
| D662,808 S | 7/2012 | Vandenberg |
| 8,348,116 B2 | 1/2013 | Xu |
| 8,353,401 B2 | 1/2013 | Hauber et al. |
| 8,382,414 B2 | 2/2013 | Vandenberg |
| D677,147 S | 3/2013 | Vandenberg |
| 8,480,343 B2 | 7/2013 | Vandenberg |
| D693,210 S | 11/2013 | Vandenberg |
| 8,627,749 B2 | 1/2014 | Desmond et al. |
| 8,672,204 B2 | 3/2014 | Vandenberg |
| 8,677,868 B2 | 3/2014 | Hoffman et al. |
| D704,018 S | 5/2014 | Vandenberg |
| 8,726,765 B2 | 5/2014 | Hoffman |
| 8,747,043 B2 | 6/2014 | Vandenberg |
| 8,832,923 B2 | 9/2014 | Hauber et al. |
| 8,869,656 B2 | 10/2014 | Desmond et al. |
| 8,925,644 B2 | 1/2015 | Vandenberg |
| 8,955,210 B2 | 2/2015 | Vandenberg |
| 9,051,726 B2 | 6/2015 | Vandenberg |
| 9,068,586 B2 | 6/2015 | Hauber et al. |
| 9,144,896 B2 | 9/2015 | Vandenberg |
| 2003/0178334 A1 | 9/2003 | Pally et al. |
| 2006/0006087 A1 | 1/2006 | Lin |
| 2008/0016989 A1* | 1/2008 | Walker ............ A61B 17/861 |
| | | 81/434 |
| 2009/0139379 A1 | 6/2009 | Chiang et al. |
| 2011/0108601 A1 | 5/2011 | Clark et al. |
| 2013/0001116 A1 | 1/2013 | Lin et al. |
| 2013/0276589 A1 | 10/2013 | Vandenberg |
| 2013/0276591 A1 | 10/2013 | Vandenberg |
| 2014/0015205 A1 | 1/2014 | Viuf |
| 2015/0321325 A1 | 11/2015 | Vandenberg |
| 2016/0221164 A1 | 8/2016 | Walters et al. |

FOREIGN PATENT DOCUMENTS

| | | |
|---|---|---|
| DE | 202012003275 | 6/2012 |
| DE | 102012007639 | 10/2013 |
| EP | 0749808 | 12/1996 |
| JP | 1974-014517 B | 4/1974 |
| JP | 1981-176174 U | 12/1981 |
| JP | 2004-011745 A | 1/2004 |
| WO | 2008104093 | 9/2008 |

\* cited by examiner

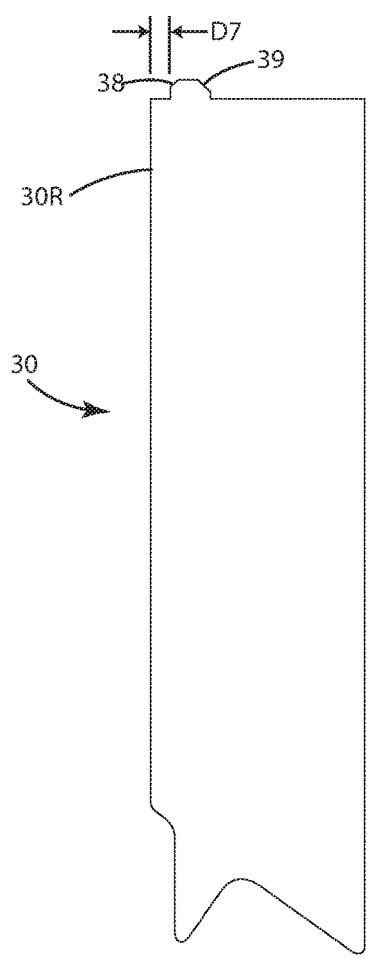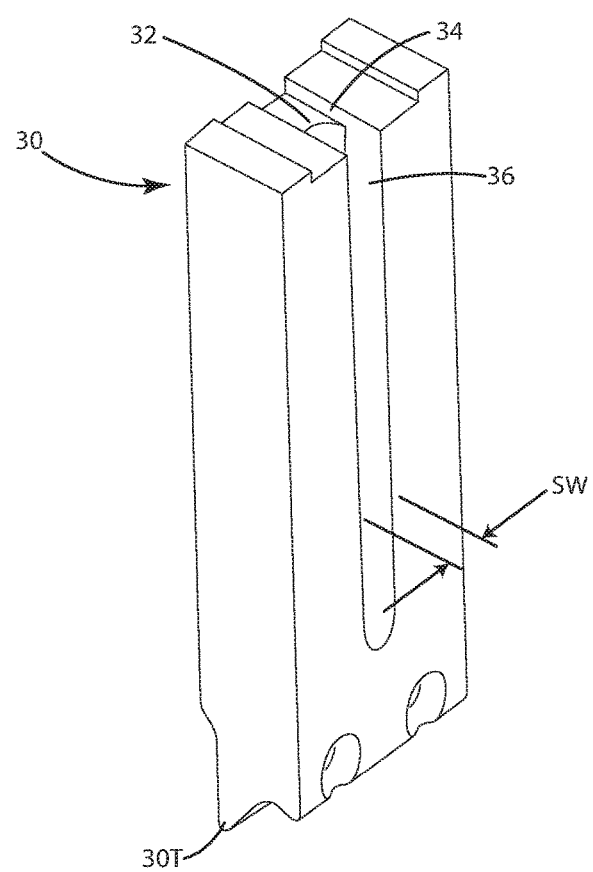
Fig. 8
Fig. 9

TENSION FED FASTENER INSTALLATION TOOL AND RELATED METHODS OF USE

BACKGROUND OF THE INVENTION

The present invention relates to fasteners, and more particularly, to a tension fed fastener installation tool and a related method of use.

There are a variety of fasteners, such as screws, that are used widely to fasten objects together or attach one object to the other. Cordless or electric installation tools are frequently used to drive screws to save time and increase work efficiency. Many installation tools, such as screw guns, use collated screws to further increase the work efficiency. In use, most screw guns operate to feed a flexible collated strip of screws from the bottom of the tool toward the nose of the tool, where the individual screws are separated from the collated plastic strip and driven into a substrate or object.

Most conventional screw guns include a special pusher feeder. The strip of screws is fed through the gun via the pusher feeder, which engages notches in the sides of the collated strip with one or more teeth. The teeth are advanced by some action of a user, for example, via the user pushing the tool toward the substrate or object, so that the teeth engage a few select side notches, and push the collated strip toward the nose of the tool for driving.

While conventional screw guns with this type of pusher feeder work, they suffer a variety of shortcomings. First, the pusher feeder many times requires a complicated mechanism to actuate the teeth with some sort of motion imparted on the tool by the user. This mechanism may utilize a separate drive that rotates a toothed gear to push the strip when the user initially pushes down on the tool. Second, in some cases, the forward push of the strip toward the nose must be perfectly timed, or the pusher feeder may create a jam or a misfeed of the strip. In turn, to fix the jam, the user typically disassembles the nose piece, which can be time consuming and frustrating. Third, the flexible screw strips can be difficult to manage, and at times it is difficult to prevent the screws on the flexible strip from bunching or tangling as the strip is pushed toward the nose piece for a driving sequence.

Accordingly, there remains room for improvement to provide an installation tool and related method for fasteners in a collated strip, where the collated strip is fed more efficiently and is less prone to jamming, misfeeds, bunching and/or tangling.

SUMMARY OF THE INVENTION

A fastener installation tool, a strip of collated fasteners and related methods of use are provided. In one embodiment, the installation tool includes a frame, a guide joined with the frame, and a tension feeder configured to pull a strip of collated fasteners along a collated fastener path. The tension feeder is located downstream of the guide and configured to apply tension to a portion of the strip between the guide and a leading end of the strip.

In another embodiment, the tool tension feeder includes an elongate member that coils retractably into a roll. The tension feeder can include an attachment element, such as a pin, that is configured to attach to the leading end of the strip to facilitate pulling it through the tool, and the guide in particular.

In still another embodiment, the tool can include a guide having a bore through which fasteners are advanced out the tool. The guide can include a guide wall adjacent the bore and a fastener stop, also referred to as a backstop, adjacent the guide wall. This fastener stop can arrest movement of a fastener along the collated fastener path so that a tip and/or shaft of the fastener swings into alignment with the bore, optionally when the head collides with the fastener stop.

In even another embodiment, the tool can be outfitted with a guide including a head size adjuster element that is configured to engage a corresponding backstop so as to set the guide to accommodate a preselected head size. Optionally, the head size adjuster element is adjustable so that different sized guides for different sized fasteners (for example, different head diameters, shank sizes, lengths, etc.) can be fed through different guides.

In yet another embodiment, the tool can be configured to receive different guides for fasteners of different configurations. One guide can be for a hidden fastener, while a second guide can be for a face fastener. Each guide can include respective adjuster engagement parts adapted to engage the head size adjuster element so as to set the backstop to accommodate either the hidden fastener or the face fastener, depending on which guide is installed in the frame.

In yet another embodiment, the tool can include a depth of drive adjuster configured to establish the depth to which a fastener is driven into a workpiece with the tool. The depth of drive adjuster can include a top block that is movably joined with the frame. The top block can be moved relative to the frame in the guide to set a point of engagement of a power tool with the installation tool as the power tool rotates a driving element to advance a fastener through the guide.

In a further embodiment, a method of using the fastener installation tool is provided. The method can include pulling on a strip of collated fasteners at a location downstream of a guide, the strip including a carrier and a plurality of fasteners, and advancing a first fastener from the plurality of fasteners into a workpiece.

In still a further embodiment, the method can include attaching a tension feeder to substantially only a leading end of the carrier so that the tension feeder can pull on the carrier at substantially only the location downstream of the guide. Optionally, a trailing end of the carrier remains upstream of the guide during the pulling step.

In yet a further embodiment, the method can include placing no tension during the pulling step and/or during the advancing step on a portion of the carrier between the trailing end and the guide.

In still a further embodiment, the method can include aligning the first fastener with the bore of the guide by engaging a head of the fastener against a backstop of the guide, and pulling on a shank of the first fastener with the carrier so that a tip and/or shank of the first fastener swings into alignment with the bore. Optionally, the carrier creates a moment about a point of contact between the head of the fastener and the backstop, thereby rotating the fastener and shank within a plane within which a longitudinal axis of the fastener is disposed.

In another embodiment, the method can include attaching a leading end of the carrier at a location downstream of the guide to an elongated member; and retracting and/or rolling the elongated member onto itself to the form of a roll. Optionally, the elongated member is joined with a tensioner spring. The tensioner spring retracts the elongated member toward the tensioner spring, thereby pulling along with the elongated member anything attached to it, for example. the carrier of the strip of collated fasteners.

In still another embodiment, the method can include securing a tension feeder pin to the carrier at a leading end of the strip or carrier. The tension feeder pin is further joined with a tension feeder that performs the pulling step. The tension feeder can be the only part of the tool that moves the carrier past the guide and/or bore. Optionally, the tension feeder places a portion of the carrier between the leading edge and a fastener engaging a backstop under tension, while not placing a portion of the carrier between that fastener and a trailing end of the carrier.

In even another embodiment, a strip of collated fasteners is provided. The strip can include a row of a plurality of fasteners and a carrier including a leading edge and a trailing edge, between which the row of fasteners is disposed. The carrier can include a starter tab extending rearward from the leading edge. The starter tab can be void of any fastener holes defined therein, and void of any fasteners therein.

In yet another embodiment, the carrier can include a loaded portion with which all the fasteners in the strip are joined. The loaded portion can extend from the trailing edge to the starter tab. The loaded portion in other portions of the carrier can include optional side notches so that the strip of collated fasteners can be used with other tools.

In still yet another embodiment, the starter tab can define a feeder element aperture dimensioned to receive a feeder element pin therethrough. Where the feeder element pin is attached to a tension feeder, the feeder can move the carrier through a guide of an installation tool.

In a further embodiment, the feeder element aperture can be spaced from a first fastener hole a second distance. This second distance can be greater than a first distance separating each adjacent one of the plurality of fastener holes.

In yet a further embodiment, a method of using the strip of collated fasteners is provided. The method can include extending the carrier through a guide along a collated fastener path so that the starter tab projects forward of the guide and a loaded portion of the carrier, and engaging the starter tab with a feeder to sequentially advance the plurality of fasteners through the guide. All of the fasteners are joined with the loaded portion, which projects rearward of the guide and which extends from the trailing edge to the starter tab, stopping short of that starter tab.

In another embodiment, the fastener installation tool can be configured to attach to and be driven by virtually any type of drive tools. Many drive tools have different sized chucks or drive components. With this embodiment, an operator of the tool can, for example, selectively connect either a large conventional chuck, for example, a ⅜ inch drive chuck to the tool, or a smaller hexagonal shaped driver to the tool.

In yet another embodiment, the tool can include a driveshaft having a drive end including a main drill drive attachment body defining an exterior surface, to which a first larger drive tool chuck can be attached. The main drill drive attachment body also can define a socket that receives and rotationally restrains a replaceable drive bit. The bit's drive feature can be new or worn out, and can be concealed in the driveshaft, as it is not used anyway. A second portion of the bit, however, can extend outward beyond the main drill drive attachment body for attachment to a chuck or drive component of a second drive tool, that is of a different size than the first larger drive tool.

In yet another embodiment, the tool can be configured to receive one or more replaceable guides. Such guides can be outfitted to install different types of guides in different types of application. The guides also can be configured to work with fasteners of different head sizes and different shank sizes unique to the application.

In still another embodiment, a replaceable guide can include a guide body defining a guide bore and including a sidewall defining a feed slot. The slot can be configured so that a shank of a fastener can enter the bore through the feed slot. A guide head can be joined with the guide body, above the guide bore. The guide head can include a backstop configured to engage a head of a fastener to facilitate tilting of the shank so as to align the fastener with the guide bore. The guide can define a carrier slot below the backstop and above the feed slot. The carrier slot can slidably receive a collated fastener carrier carrying the fastener.

The current embodiments of the fastener installation tool, strip of collated fasteners, and methods of use provide benefits in fastener applications that previously have been unachievable. For example, where the tool includes a tension feeder to pull the strip of collated fasteners through a guide or nose assembly, that strip is placed under relatively constant tension, and is unlikely to sag, become tangled, misfeed and/or jam. Further, if the strip does become jammed or misfeeds, it is easily accessed to correct the same. The pulling of the strip of collated fasteners through the tool—in contrast to conventional pushing of the carrier through the tool—also leads to more consistent alignment of the fastener with a guide bore. Where the tool includes a backstop to engage a portion of a fastener, that fastener can be properly aligned with the bore. Where the tool includes a depth of drive adjuster, the drive depth of the tool can be easily set without the use of adjustment tools. Where the guide is removable and replaceable relative to the tool, different guides for different sized fasteners can be easily mixed and matched with the tool depending on the job. No additional tools are needed for this replacement. With the strip of collated fasteners including a starter tab, the strip can be easily installed in a tool. The starter tab can provide the primary point of contact with a tension feeder or other feeder to move the collated strip of fasteners through the tool.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 5A is a closeup of a backstop engaging and positioning a fastener in the guide;

FIG. 8 is a side view of a first guide adapted to guide a first fastener;

FIG. 9 is a perspective view of the first guide;

DESCRIPTION OF THE CURRENT EMBODIMENTS

Figure 1:
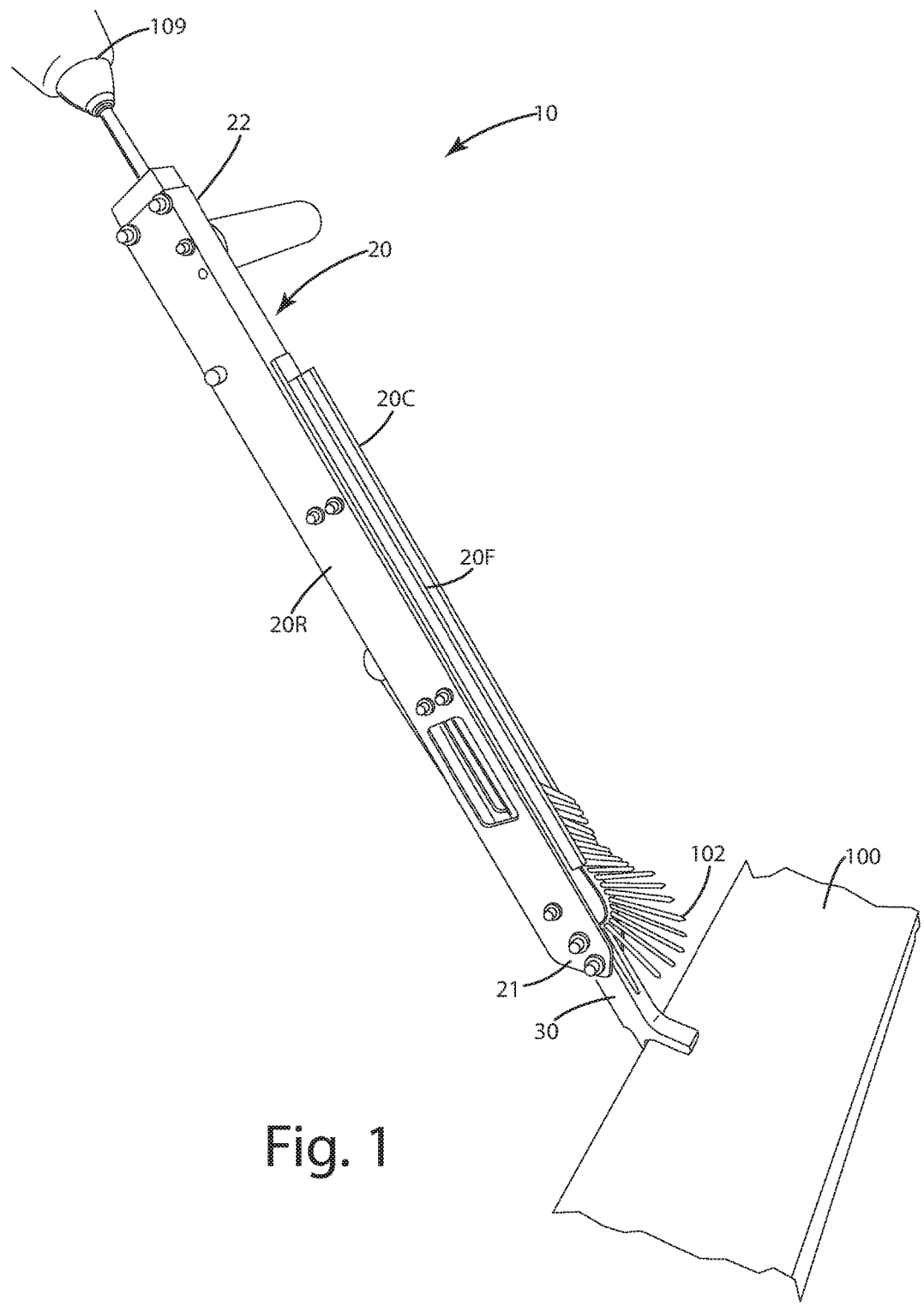
FIG. 1 is a perspective view of a fastener installation tool of a current embodiment joined with a driving tool to advance fasteners into a workpiece.

A current embodiment of the installation tool is illustrated in FIGS. 1-17 and designated 10. Generally, the installation tool 10 is configured to advance a strip of collated fasteners 80 toward a guide 30, so that individual fasteners from the strip are sequentially guided through the guide and advanced into a workpiece 100. The installation tool can utilize a method whereby it advances the strip 80 by pulling on a leading end 81 of a carrier 85, primarily at a location downstream from the guide 30 or more generally the location where the fastener is separated from the strip 80. The carrier 85 of the strip 80 includes a starter tab 84 between the leading end 81 and a loaded portion 86 with which all of the fasteners are joined.

As used herein, "fastener" can include screws, nails, brads, and the like. Optionally, an exemplary fastener, shown in FIGS. 5A and 19 can include a shank 107, which can be threaded or unthreaded, as well as a head 102 joined at the uppermost portion of the shank. The head can be configured to include a drive feature 103, such as an outer surface, or a hole or recess defined by the head or shank. Where the drive feature 103 is a hole, that hole optionally can be in the shape of a six-pointed star. The generic name of this type of drive feature is a star drive, or hexalobular internal drive feature, which is standardized by the International Organization for Standardization as ISO 10644. One optional type of star drive feature is a TORX drive, which drive comes in a variety of sizes, generally designated by a "T" and some number, such as T-10, T-15, T-20, T-25, T-30, T-35 and the like. TORX is a trade name of Textron, Inc. of Providence, R.I. The drive feature optionally can be configured to connect to a drive tool, such as a rotary operated tool, for example, a drill and/or a drive element associated with the same, that turns or rotates the head, and thus the fastener, to advance the fastener into a workpiece as described in further detail below.

Figure 5:
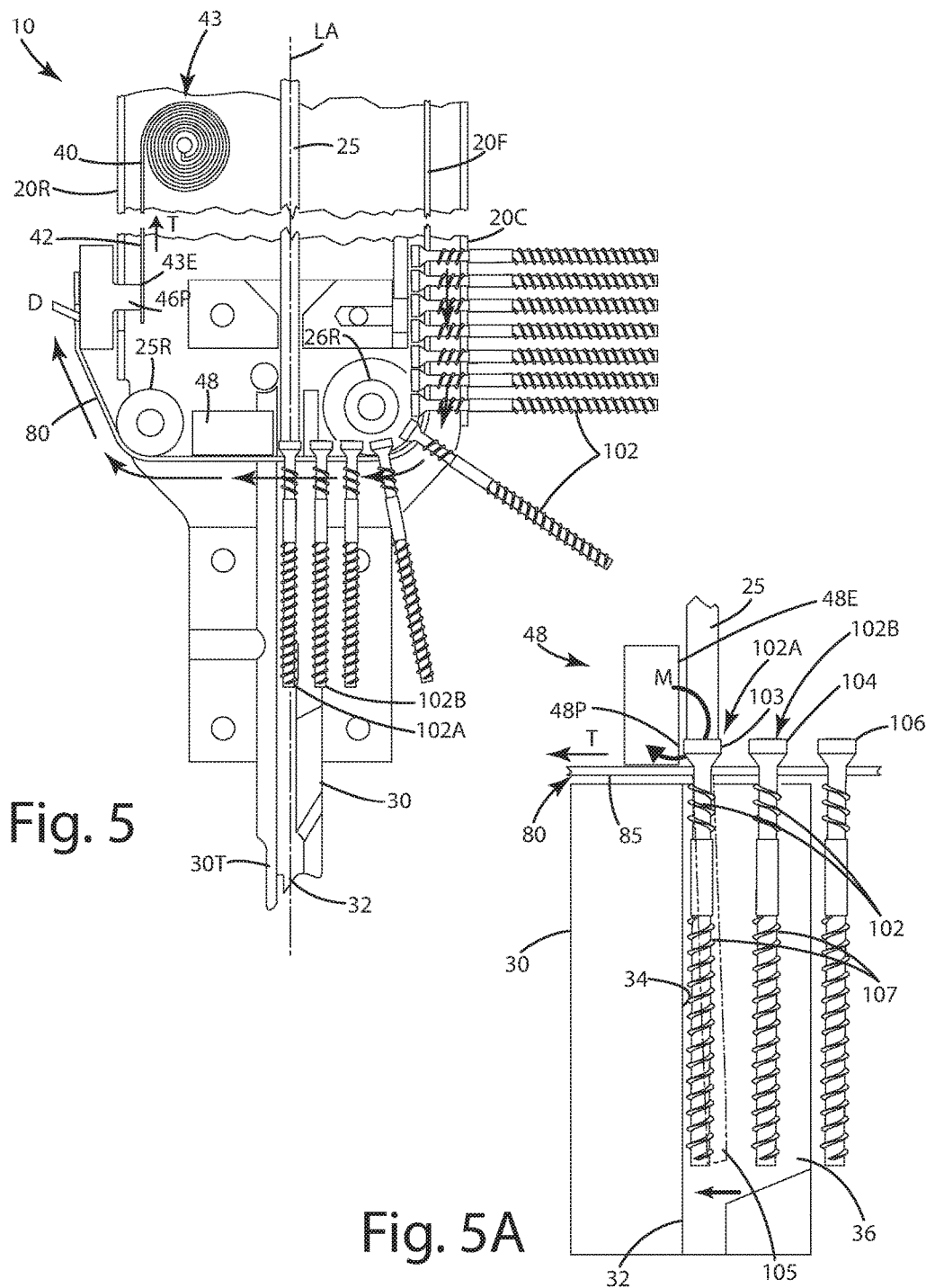
FIG. 5 is a sectional side view of the tool with the tool in a neutral mode before engaging a workpiece.

As used herein, "collated fastener path" can include the path along which the strip of collated fasteners 80 is advanced. The collated faster path can extend in multiple directions, for example downward toward the guide, transverse to the guide, and upward away from the guide. As used herein, the term "upstream" and "downstream" generally can refer to locations relative to the guide 30, its bore 30B, and/or generally the location of a fastener being advanced by the tool. Upstream can refer to a location along the collated faster path that is situated before the guide, bore and/or advanced fastener. Downstream can refer to a location along the collated faster path that is situated after or beyond the guide, bore and/or the advanced fastener. Upstream U and downstream D are generally illustrated in FIG. 5; however, their precise locations are not limited to only those configurations and slight modifications are contemplated.

Turning now to the tool 10 illustrated in FIGS. 1-6, its components and structure will now be described in further detail. The tool 10 can include a frame 20, to which the guide 30 is joined. The frame 20 can house a rotating drive element 25, which is rotationally constrained and/or guided within the frame during a fastener advancing operation. The drive element 25 and the frame 20 in general are configured to be selectively and removably joined with a drive tool 109. The drive tool can be an electric or cordless drill having a chuck adapted to join with the drive element so that the drive tool can rotate the same. The drive element 25 can rotate about a longitudinal axis LA. The drive element 25 can include a drive end that engages a drive feature of a fastener to rotate the same. The drive element also can include a chuck end that is configured to engage a drive tool to enable the drive tool to rotate the drive element 25. Optionally, the drive element can be a replaceable drive bit including a first and a second end. The drive feature, optionally in the form of the TORX drive mentioned above, can be at the first end. The second end can be in the form of a particular shape, for example a hexagonal shape, square shape, elliptical shape, irregular shape, etc., configured to interface with a lower portion of the driveshaft as described further below.

As shown in FIGS. 1-4, the frame 20 includes a first or installation or lower end 21, to which the guide 30 is joined, and a second or upper end 22 to which the drive tool 109 can be joined. The frame can generally be an elongated tubular structure configured to house various components, such as the drive element 25, the guide 30 and the tension feeder 40. The frame can be of a length sufficient to enable an operator to use the tool in a standing upright configuration, while applying fasteners to a distal workpiece that optionally can be at floor level, or above or in front of the operator.

The frame 20 can include a front or upper side 20F and a rear side 20R. The front side can face away from a user operating the tool, while the rear side can face toward a user operating the tool. The front side 20F can include a strip guide channel 20C. The strip guide channel 20C can be U-shaped or C-shaped, and generally configured to capture the carrier 85 of the strip 80 and passively guide it from the front side of the frame through the guide 30. The strip guide channel 20C can be of a length sufficient to accommodate a full length strip of collated fasteners. When the carrier is disposed in the guide channel, it can freely slide within the guide channel, thereby allowing the strip of fasteners to move along the collated fastener path CFP. The guide channel 20C can be located upstream U of the guide. A strip 80 disposed in the guide channel 20C can extend from that component all the way to the guide 30 and beyond, optionally attached at its opposing end to the tension feeder 40. In most cases, before the strip of collated fasteners is emptied of its fasteners, a trailing end 82 of the carrier 85 and the strip is disposed and slides within the guide channel 20C.

As shown in FIG. 5, the frame 20 optionally can include one or more strip rollers 25R and 26R. These rollers are disposed at the lower end 21 of the frame and are configured to provide guide surfaces to the strip and in particular the carrier and its left 85L and right 85R side edges. The rollers can be rotatably mounted to the frame so they rotate as the strip is pulled through the tool under tension provided via the tension feeder 40. The lowermost portions of the rollers can be aligned with the collated fastener path CFP. The rollers can position the strip 80 so that the heads of the respective fasteners 102 are aligned with the backstop 48 so that the backstop can arrest and/or engage fasteners to properly align them with the bore and/or guide. Optionally, the rollers 25R and 26R can be disposed on opposite sides of the longitudinal axis LA of the tool 10, which longitudinal axis can correspond with a centerline of the drive element 25. Further optionally, one of the rollers can be upstream of the drive element, while the other can be downstream of the drive element. Further optionally, the rollers can be absent from the frame, or replaced with non-rotating guide elements, such as a low friction bumper to assist in guiding the strip through the tool.

Figure 2:
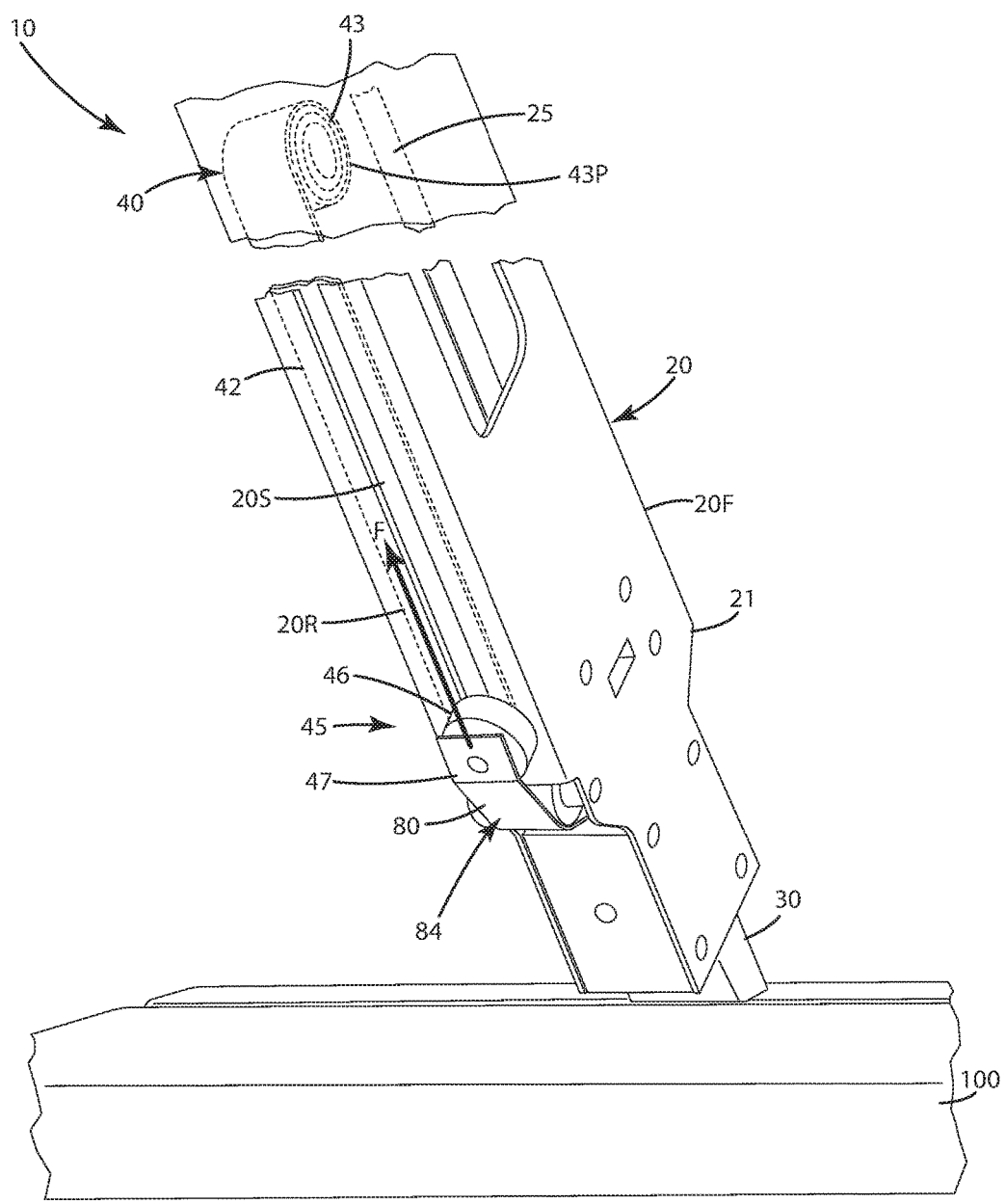
FIG. 2 is a rear view of the tool illustrating a tension feeder of the tool.
Figure 3:
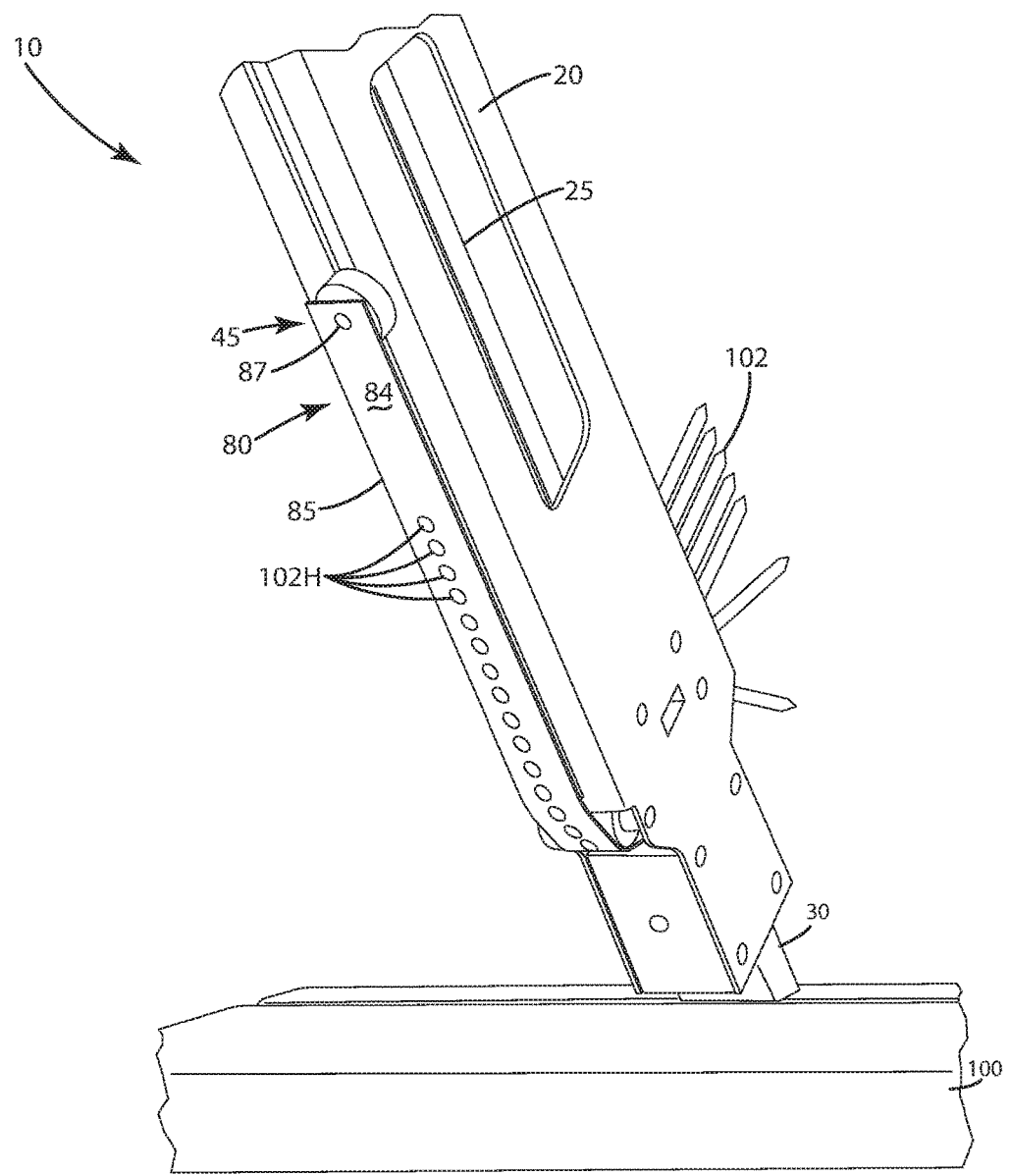
FIG. 3 is another rear view of the tool illustrating the tension feeder having pulled a strip of collated fasteners.
Figure 4:
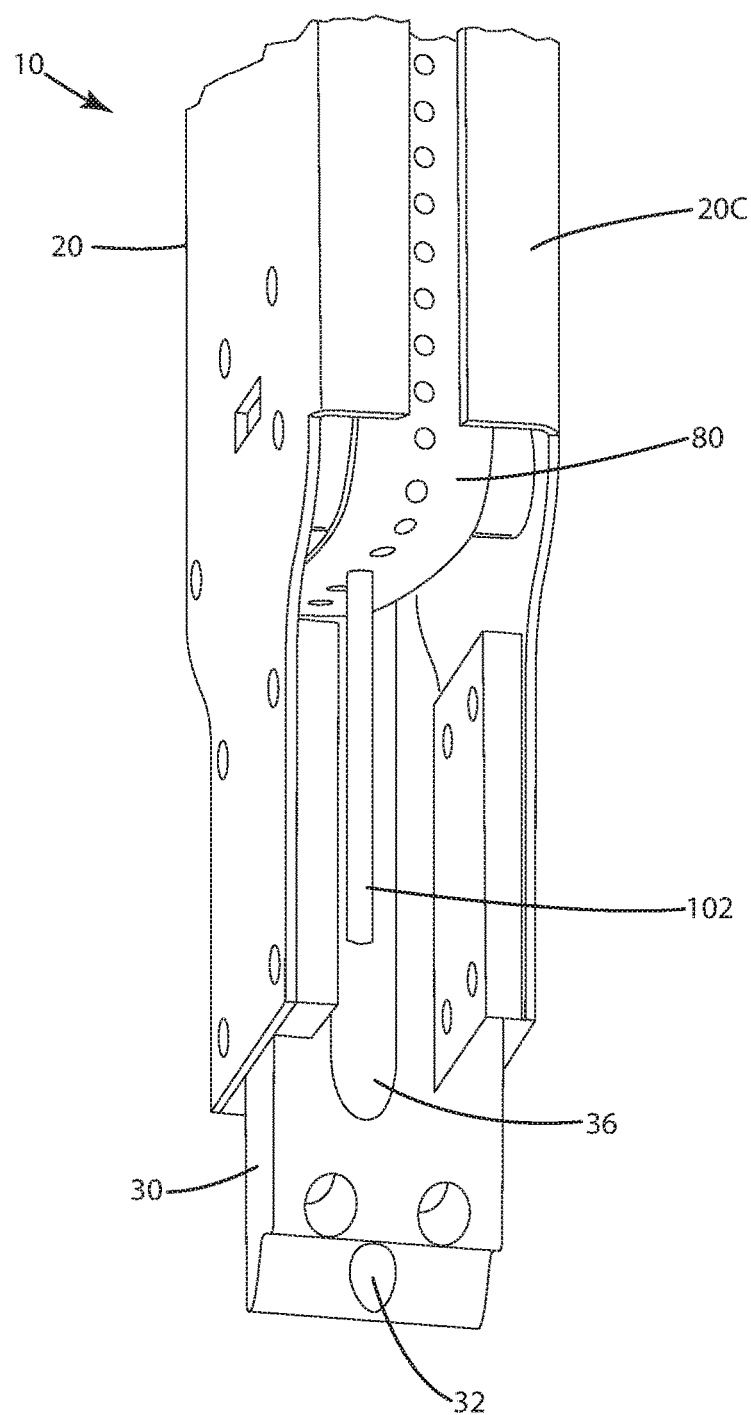
FIG. 4 is a front view of the tool illustrating a front of the guide upon feeding the strip into the guide.
Figures 15, 15A:
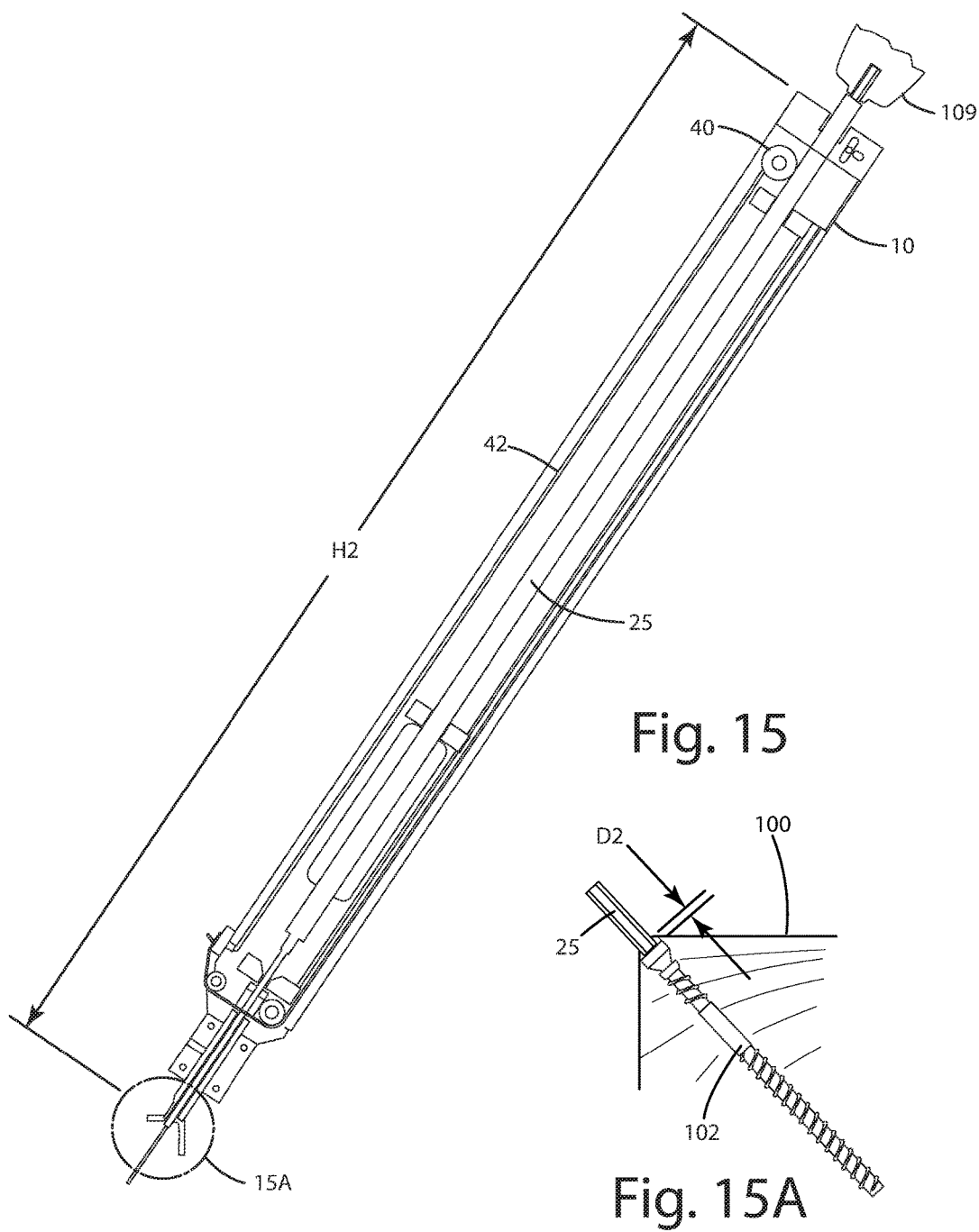
FIG. 15 is a sectional side view of the depth of drive adjuster in the first depth mode.
FIG. 15A is a closeup of the fastener depth of drive in the first depth mode.

The frame 20 is joined with the tension feeder 40 as shown in FIGS. 2, 5 and 15. The tension feeder can generally be adjacent the rear 20R side of the frame, with many of its components housed substantially inside the frame to prevent dust and debris engaging the same, potentially damaging its components. The tension feeder 40 can include an elongated member 42 that extends down the rear 20R side of the frame, optionally from the upper end 22 to the lower end 21. The elongated member can be a continuous sheet or strip of material, constructed from metal, plastic, composites and/or combinations thereof. Optionally, the elongated member can be flexible so that it can be rolled over and over upon itself in a cylindrical roll. In other cases, the elongated member can be configured so that it does not roll upon itself and instead extends from the lower end to the upper end of the frame and then back toward the lower end or installation end.

The tension feeder 40 can include a biasing member 43 joined with the elongated member 42. The biasing member 43 can be a coil spring, a powered spool, a windup mechanism, or some other mechanism configured to forcibly pull on and/or apply tension to the elongated member 42. The biasing member 43, sometimes referred to as a tension spring, shown in FIGS. 2 and 5, can be rotatably joined with a portion of frame 20, optionally at the upper end 22. The biasing member can be attached at a pin 43P to the frame, where the pin extends from a left side to a right side of the frame.

When in the form of a coil spring, the biasing member or tension spring can be urged to effectively furl or roll upon itself in a clockwise or counterclockwise motion. Accordingly, because the biasing member is joined with the elongated member 42, the biasing member exerts a tension or pulling force on the elongated member. Further, the biasing member 43 can retract the elongated member into a roll as well. In this case, the elongated member can furl or roll upon itself over and over.

Optionally, the biasing member when in the form of a coil spring can apply a constant pulling force at its distal end 43E. In other cases, the pulling force or tension exerted by the biasing member via the elongated member can decrease from a higher tension or force, to a lower tension or force as the elongated member is rolled into a roll. Generally, the tension feeder, in particular the biasing member, can be configured so that the tension feeder can apply a pulling force of optionally at least 5 pounds, further optionally at least 10 pounds, even further optionally at least 20 pounds, yet further optionally at least 30 pounds on the collated strip of fasteners when attached thereto. In some cases, the biasing member, when in the form of a tensioner spring, can be a constant force spring that is configured to have a relatively constant, unchanging pull on the elongated member and thus the strip from start to finish. This constant spring force can exert a pull force to whatever it is attached of optionally 1 pound to 10 pounds, further optionally 2 pounds to 8 pounds, and even further optionally 2 pounds to 5 pounds.

The tension feeder can be attached to the strip of collated fasteners 80, as shown in FIGS. 2 and 5, with an attachment element 45. The attachment element 45 can be joined with the end 43 of the elongated member 42. The attachment element can include a grasping portion 46 which can enable a user to pull the elongated member in particular its end 43E away from the roll, generally to a position as shown in FIG. 2. Where the grasping portion 46 is joined with the end 43E via a pin 46P, the frame can define a slot 20S, optionally in the rear 20R of the frame. This can enable the pin to move within and be guided by the slot. The grasping portion 43 can move on the exterior of the frame, generally adjacent the rear surface 20R of the frame, while the elongated member is disposed in and moves, optionally unrolling, on an interior of the frame. The grasping portion can enable a user to pull the elongated member to a location near the guide, the location being sufficient to pass a starter tab through the guide to attach to the elongated member. The grasping portion can include a gripping surface such as a knurled surface. In other constructions, it can include a handle or cord to assist in pulling it.

The attachment element 45, and the tension feeder 40, is configured to attach to a leading end 81 of the carrier 85. In one construction, the attachment element 45 can include a feeder element pin 47 sized and dimensioned to extend through a feeder element aperture 47 defined in the starter tab 84 of the carrier 85 of the strip 80. The feeder element pin 47 can be of a cylindrical construction. Optionally, the feeder element pin 47 can be bent or angled upward in a direction away from the guide to ensure that the carrier does not slip off of the element. In some cases, the feeder element pin 47 can be angled optionally 45°, further optionally 60° and even further optionally 80° relative to the longitudinal axis LA. Although not shown, the feeder element pin can include a closure to secure the leading end of the carrier to the attachment element.

Figure 17:
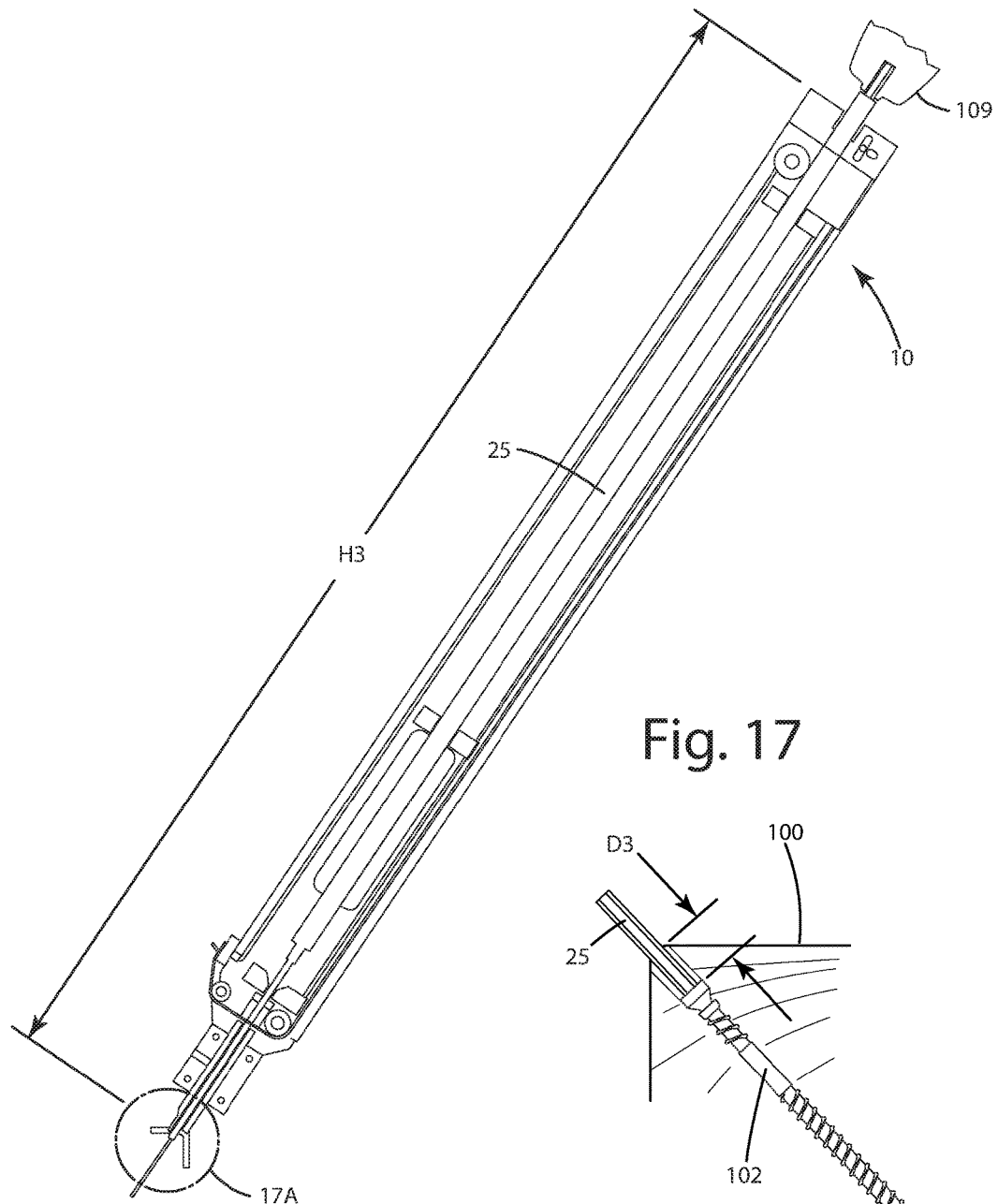
FIG. 17 is a sectional side view of the depth of drive adjuster in the second depth mode.
Figure 17A:
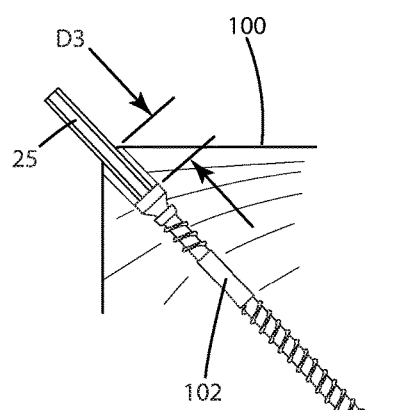
FIG. 17A is a closeup of the depth of drive in the second depth mode.

The tool 10, as noted above, can include a depth of drive adjuster 50, which also can be joined with the frame as shown in FIGS. 14-17. The depth of drive adjuster 50 can be connected to the upper end 22 of the frame 20. The adjuster 50 can be arranged to contact a portion of the drive tool 109 and stop its advancement toward the guide. In turn, this stops advancement of the drive element 25 through the guide 30 and the associated advancement of the fastener 102 into a workpiece 100. In turn, this effectively sets the depth of drive of the fastener 102 into workpiece 110 as shown in FIGS. 15B and 17A. There, the respective fasteners 102 are driven to different depths D2 and D3 into the workpiece. For example, D2 is a lesser depth than D3. These different depths can be achieved by adjusting the depth of drive with the depth of drive adjuster 50. In fact, the depth of drive adjuster can shorten or lengthen the working length of the drive element 25 to selectively set the depth of drive a fastener is being advanced by that drive element 25.

Figure 14:
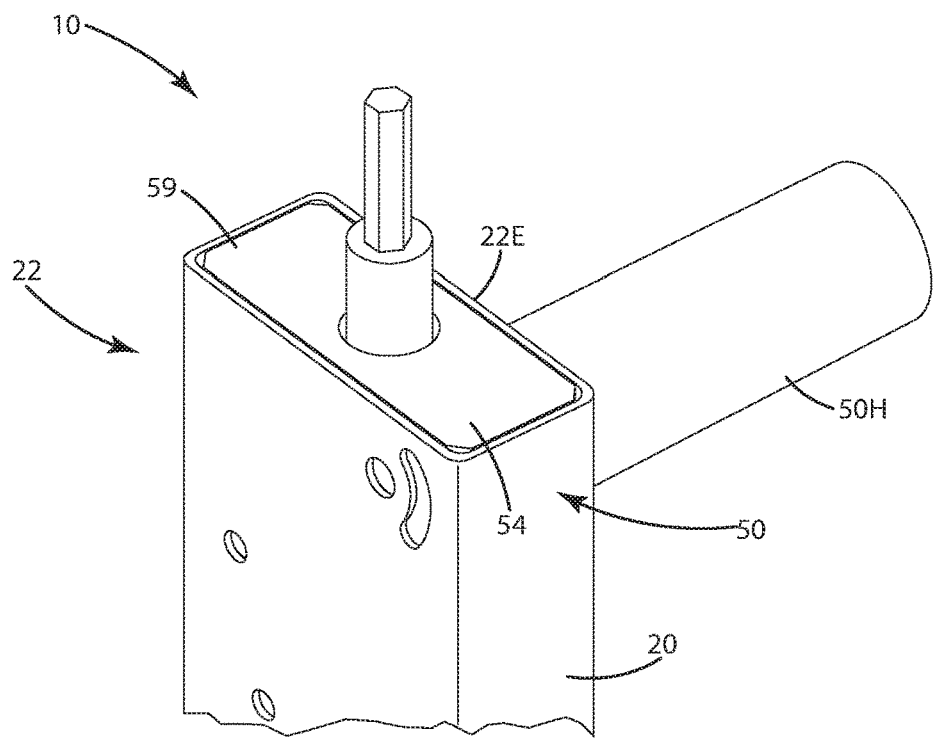
FIG. 14 is a perspective view of a depth of drive adjuster associated with the tool in a first depth mode.

The depth of drive adjuster 50, shown in FIGS. 14 and 15, can be associated with a handle 50H. The handle 50H can assist a user in moving the frame to different locations and generally operating the tool. The handle 50H can be rotatably mounted to the frame 20. In operation, rotation of the handle 50H can be used to adjust and set the depth of drive adjuster 50 to a desired drive depth for fastener. The depth of drive adjuster 50 can further include a stop block 54. The stop block 54 can include an upper surface 59 that is configured to engage the drive tool 109, effectively stopping the drive tool from moving closer to the guide 30 of the tool 10.

The handle 50H can be mounted on a pivot axle 53 that is fixedly joined with the frame 20. The pivot axle 53 can be mounted in a generally vertical slot 55 defined by the stop block 54. The stop block also can define an adjuster slot 56 within which an adjuster pin 57 moves. This adjuster pin 57 can also be attached to the handle, a set distance from the pivot axle 53. Rotation of the handle 50H can be translated to relative movement of the adjuster pin 57 within the adjuster slot 56. This movement translates the stop block up or down within the frame, generally away from or toward the guide at the opposing end. With the handle 50H adapted to adjust the depth of drive, no additional hand tools are needed to set the depth of drive of the tool 10. Although the system of pins and slots in the stop block work well, other assemblies are contemplated for selectively adjusting and setting the depth of drive of the tool 10.

FIGS. 14-17 illustrate adjustment of the depth of drive of the tool. In particular, FIGS. 14 and 15 illustrate a depth of drive D2 set by the depth of drive adjuster 50. In this first depth of drive mode, the depth of drive D2 is a relatively shallow depth. This mode is set by placing the upper surface 59 of the stop block 54 at a high location relative to the upper end 22 of the frame 20. Generally, the upper surface 59 in this mode can be flush with the top edge 22E of the frame. In turn, this arrests movement of the drive tool 109 so that the connector element 25 extends only a distance H2 from one end to the other, at which it engages the fastener 102. This distance H2 enables the tool to set the depth of drive at D2 into the workpiece 100.

In a second depth of drive mode, the depth of drive D3 is of a relatively deeper depth than D2. This mode is set by placing the upper surface 59 of the stop block 54 at a lower location relative to the upper edge 22E of the frame 20. The upper surface 59 can be recessed a distance L2 relative to the edge 22E. In turn, this arrests movement of the drive tool 109 so that the connector element 25 extends a greater distance H3 from one end to the other, which engages the fastener 102. This distance H3 enables the tool to set the depth of drive at D3 into the workpiece 100.

Figure 14A:
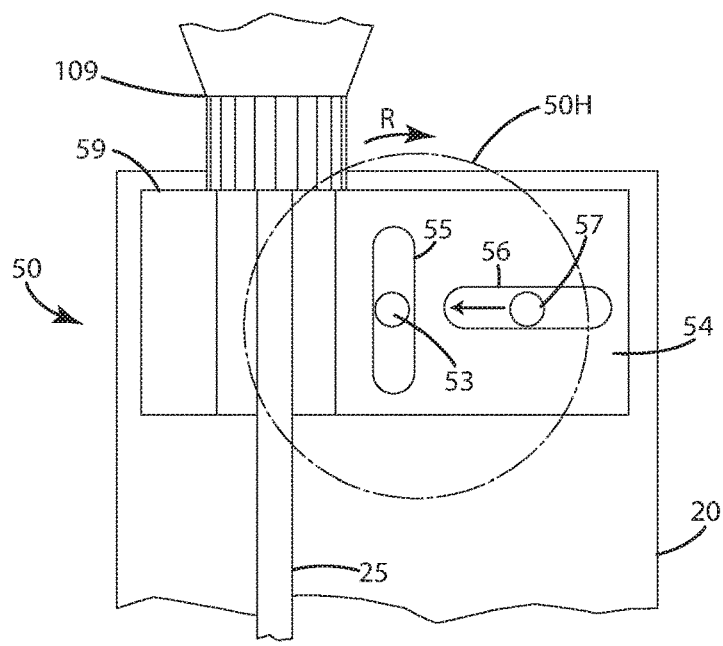
FIG. 14A is a partial section view of the depth of drive adjuster associated with the tool in the first depth mode.
Figure 16:
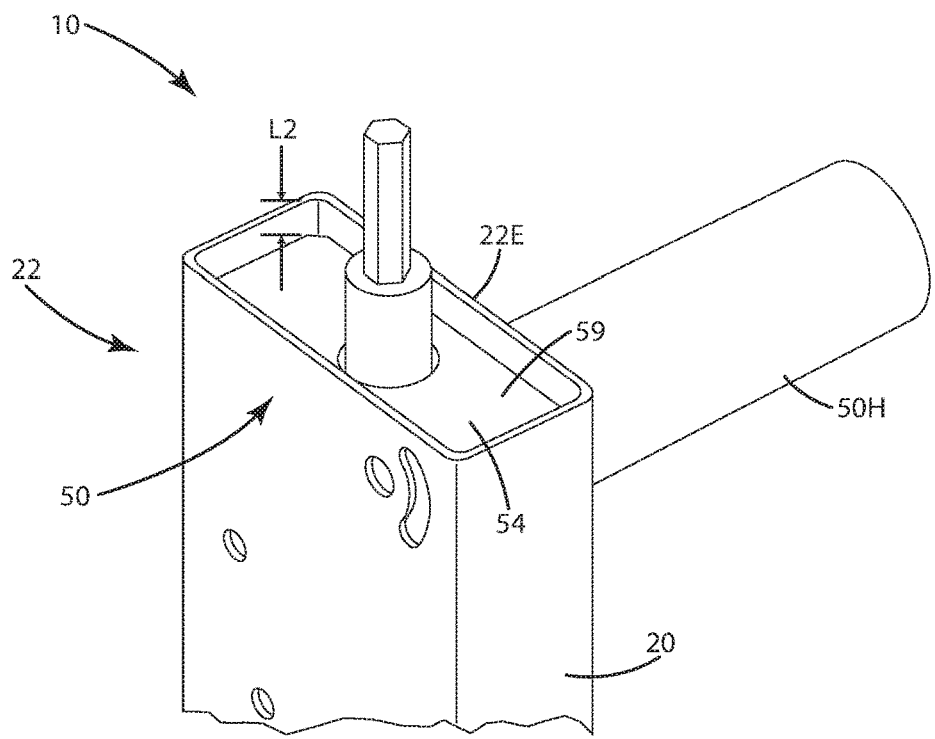
FIG. 16 is a perspective view of the depth of drive adjuster in a second depth mode.
Figure 16A:
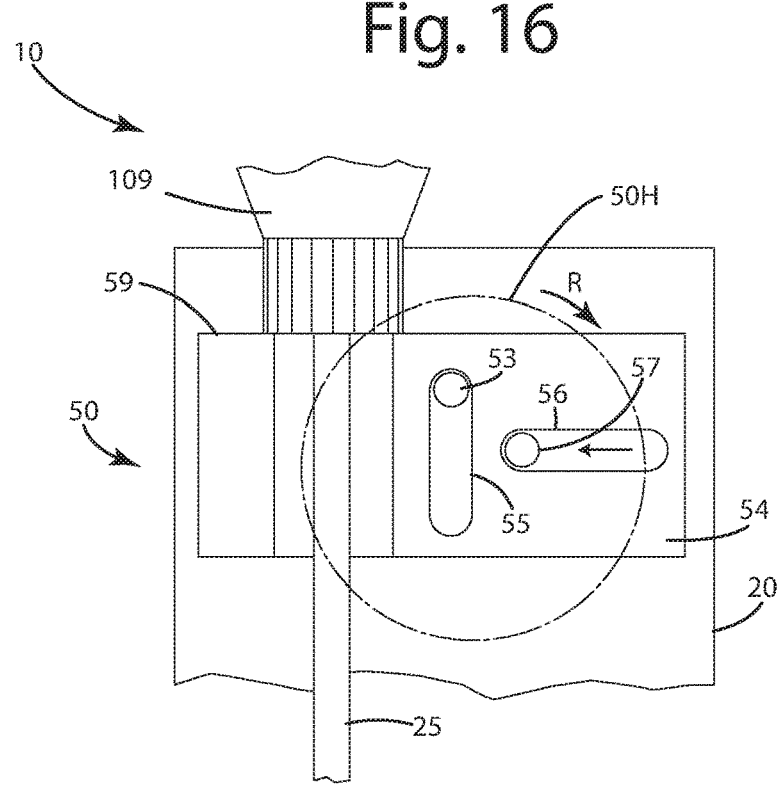
FIG. 16A is a partial section view of the depth of drive adjuster associated with the tool in the second depth mode.

Optionally, a user can use the depth of drive adjuster 50 to set the depth of drive of the tool and accommodate a variety of different sized screws as well as workpiece applications. Although shown in first and second depth modes, the depth drive adjuster can adjust the depth of drive of the tool to an infinite number of drive depths in other depth modes. To set the depth of drive adjuster 50, a user rotates the handle 50H. This can be illustrated by contrasting FIGS. 14A and 16A. By rotating the handle 50H in direction R shown in FIG. 14A, the handle rotates about the axle 53. The pin 57 thereby engages the slot 56 which in turn pushes the block 50 for the distance L2 downward from the edge 22E. The pin 53 riding in the other slot 55 guides this movement in a linear manner.

As discussed above, the installation tool 10 includes a guide 30 that is joined with the lower end 21 of the frame. The guide can be constructed from metal, plastic and/or composites and can be configured to constrain a fastener as the fastener is driven, advanced and/or rotated. The guide can be attached to the frame via bolts, pins or other fasteners.

Figure 10:
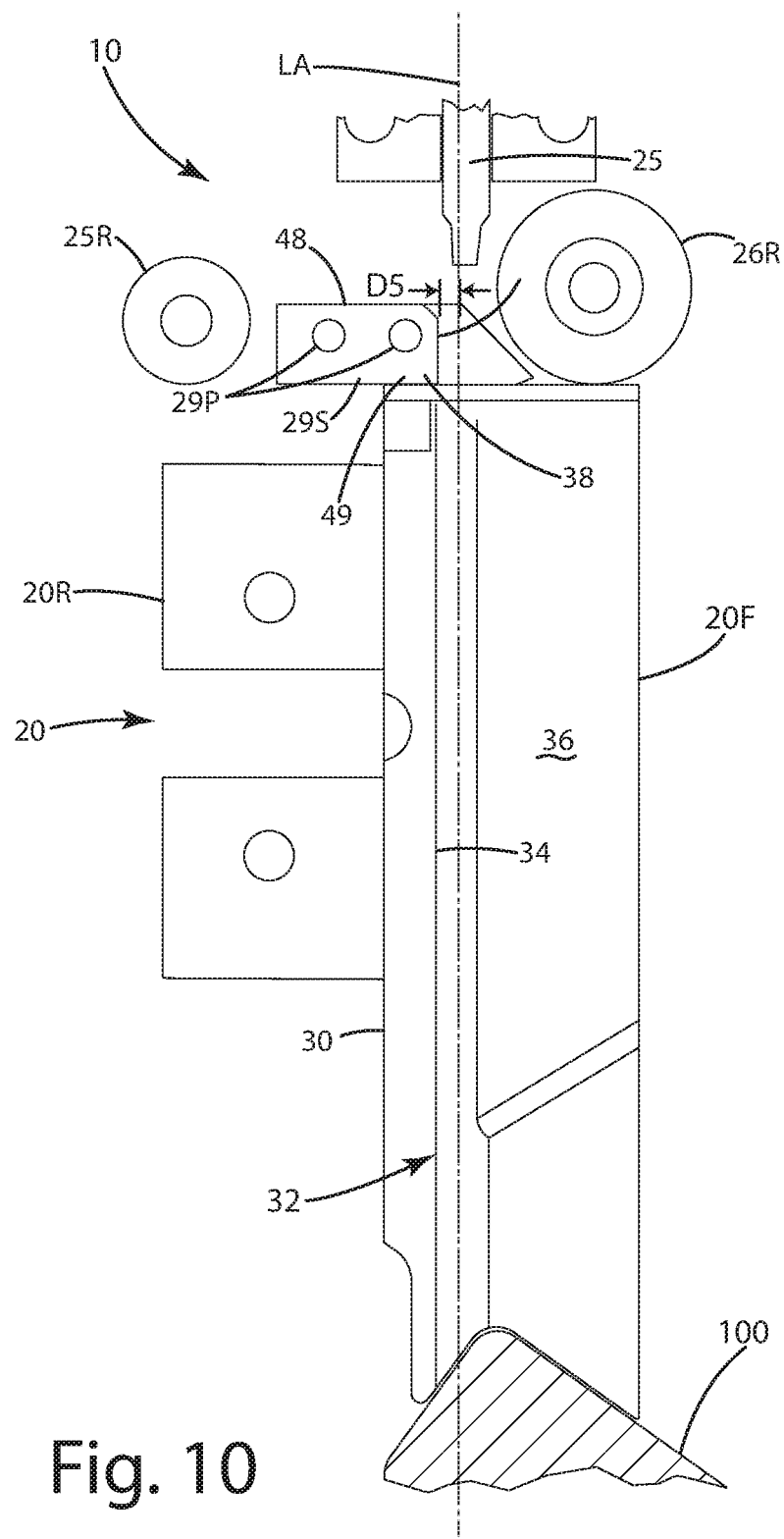
FIG. 10 is side sectional view of the first guide being installed in the frame of the tool, showing the setting of a fastener backstop for that first guide.

As shown in FIGS. 5 and 10, the guide 30 can define a bore 32. The bore can be a cylindrical bore and sized so that a fastener can rotate in it, or otherwise move or advance through it. The bore can further be sized so that its diameter is slightly larger than the diameter's widest dimension of a fastener so that the fastener can easily move through it. The bore can be sized so that it can receive only a single fastener at a time if desired. Optionally, the bore can circumferentiate a rotating fastener 100%, at least at the very tip 30T of the guide 30.

The guide 30 also can include a guide wall 34. This guide wall 34 can be the wall or portion of the guide against which each fastener is engaged or otherwise placed. This guide wall can be aligned with and/or form a portion of the bore 32. Generally the guide wall can be of a rounded and/or partially cylindrical contour. In other cases, the guide wall can be flat and/or planar, depending on the application. The guide wall can be the part of guide that the fastener initially engages. The guide wall can engage the fastener, optionally above the bore. If desired, the guide wall can be part of the bore, an extension of the bore, and/or parallel to one or more surfaces of the bore.

The guide 30 can define a feed slot 36 which is sized to enable fasteners to be fed one by one sequentially against the sidewall and/or into the bore. The feed slot 36 can be sized so that multiple fasteners can be disposed in it and generally in the guide. In some cases, the feed slot 32 can be sized so that only one succeeding fastener, after a first or driven fastener, fits within that slot 32. The remaining succeeding fasteners can be disposed outside the slot 36.

The feed slot 36 can lead directly to the guide wall 34. The feed slot also can be sized so as to only allow the shank of the fasteners to pass through that slot. For example, as shown in FIGS. 5A and 9, the slot width SW can be such so that only the shank 107 of the fasteners 102 and 104 enter the slot 36 and thus the guide 30 as they are advanced along the collated fastener path. The head of the fastener, however, does not enter the slot 36 and remains generally above the bore 32 and guide wall 34 until the fastener is advanced into and/or through the bore. As fasteners are advanced into and/or through the bore, they are aligned with that bore so that it enters the bore cleanly and consistently. This alignment can be facilitated via the guide wall and a backstop as described in further detail below.

As shown in FIGS. 5, 5A-7 and 10, the tool 10 can include a backstop 48. The backstop can be joined with the frame 20 via one or more pins 29P. These pins 29P can be disposed in a slot 29S defined by the backstop 48. Other devices can be used to attach the backstop to the frame, depending on the application and adjustability of the backstop. Optionally, the backstop is structurally independent from the guide 30 and disposed generally above the guide 30. In this location, the backstop 48 is configured to engage each respective fastener of the strip of collated fasteners as it travels along the collated fastener path CFP.

As illustrated in FIG. 5A, the backstop 48 interrupts and arrests movement of individual fasteners, for example the leading fastener on the strip, as they move through the guide and tool in general. The backstop 48 includes engagement face 48E that is positioned and configured to engage each individual fastener before the fasteners are advanced through the guide. The engagement face 48E as shown in FIG. 10 can be disposed a preselected distance D5 from the longitudinal axis LA. This distance can be selected so that when the drive element 25 advances toward the bore 32, the drive element is substantially centered on a center of a drive feature or hole 103 of the respective fastener being advanced. This enables the drive element 25 to consistently engage and advance the fasteners. The engagement face as illustrated can be substantially planar. Optionally, the engagement face 48E can be rounded and/or angled depending on the application.

As illustrated in FIG. 5A, the engagement face 48E is disposed above the carrier 85 of the strip 80. In this configuration, it can engage only the heads of the fasteners loaded on the strip. Of course, the backstop and respective engagement face can be disposed to engage other portions of the respective fasteners on the strip, depending on the application. During operation of the tool, as mentioned above, the tension feeder 40 pulls the strip 80, and in particular, the carrier 85, along the collated fastener path so that individual fasteners enter the guide 30. As the strip is pulled, the carrier is placed under tension T, at least between the attachment element and the first fastener, particularly when the head of a fastener, before being advanced by the tool, comes into contact with the engagement surface 48E. Usually, while the head engages the backstop, the carrier remains under tension T between the associated fastener and the point of attachment of the attachment element 45 to the carrier.

As shown in FIG. 5A, the backstop 48, and in particular, the engagement face 48E, engages a head of a first fastener 102. This engagement can occur at a point or surface of contact 48P. This point of contact 48P is located above the carrier 85 which is under tension T. The tension exerted by the carrier on the fastener below the head generates a moment M about the point of contact 48P. This moment M rotates, tips and/or tilts the shank 107 from an orientation shown in broken lines in FIG. 5A to the orientation shown in solid lines in FIG. 5A. In so doing, the fastener rotates or moves in a plane within which the longitudinal axis LA extends. Due to the moment generated by the tension in the carrier, the shank 107 rotates or moves toward the guide wall 34 until the shank or portions thereof engage that guide wall. During this movement, the tip 105 of the fastener also can tilt, move and/or rotate toward the guide wall, all while the head of the fastener remains in a generally constant position, aligned with the drive element 25. With the shank and/or portions thereof engaging the guide wall and/or portions of the bore, the fastener is reasonably aligned with the bore 32 so that when the drive element 25 begins to advance the fastener, it will cleanly and consistently enter that bore and be advanced through it.

Figure 11:
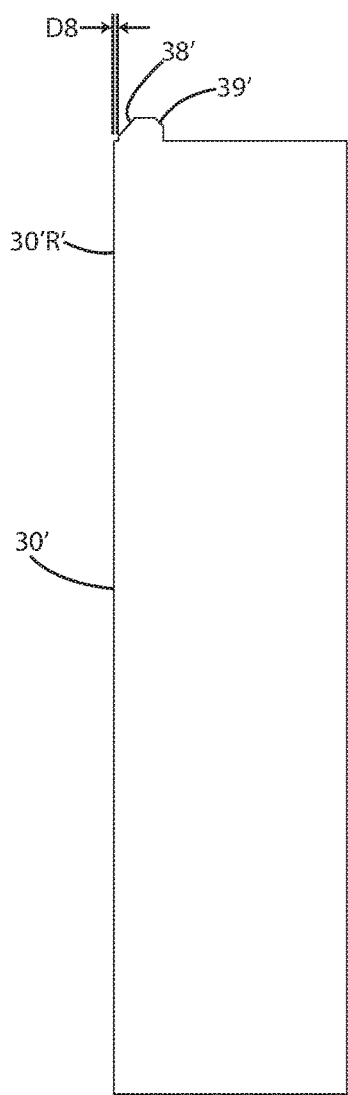
FIG. 11 is a side view of a second guide adapted to guide a second fastener, different from the first fastener.
Figure 12:
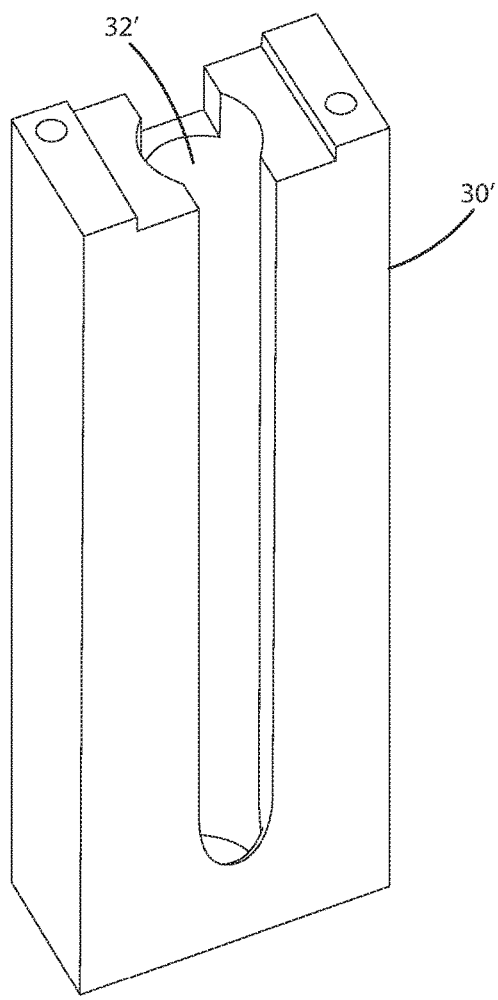
FIG. 12 is a perspective view of the second guide.
Figure 13:
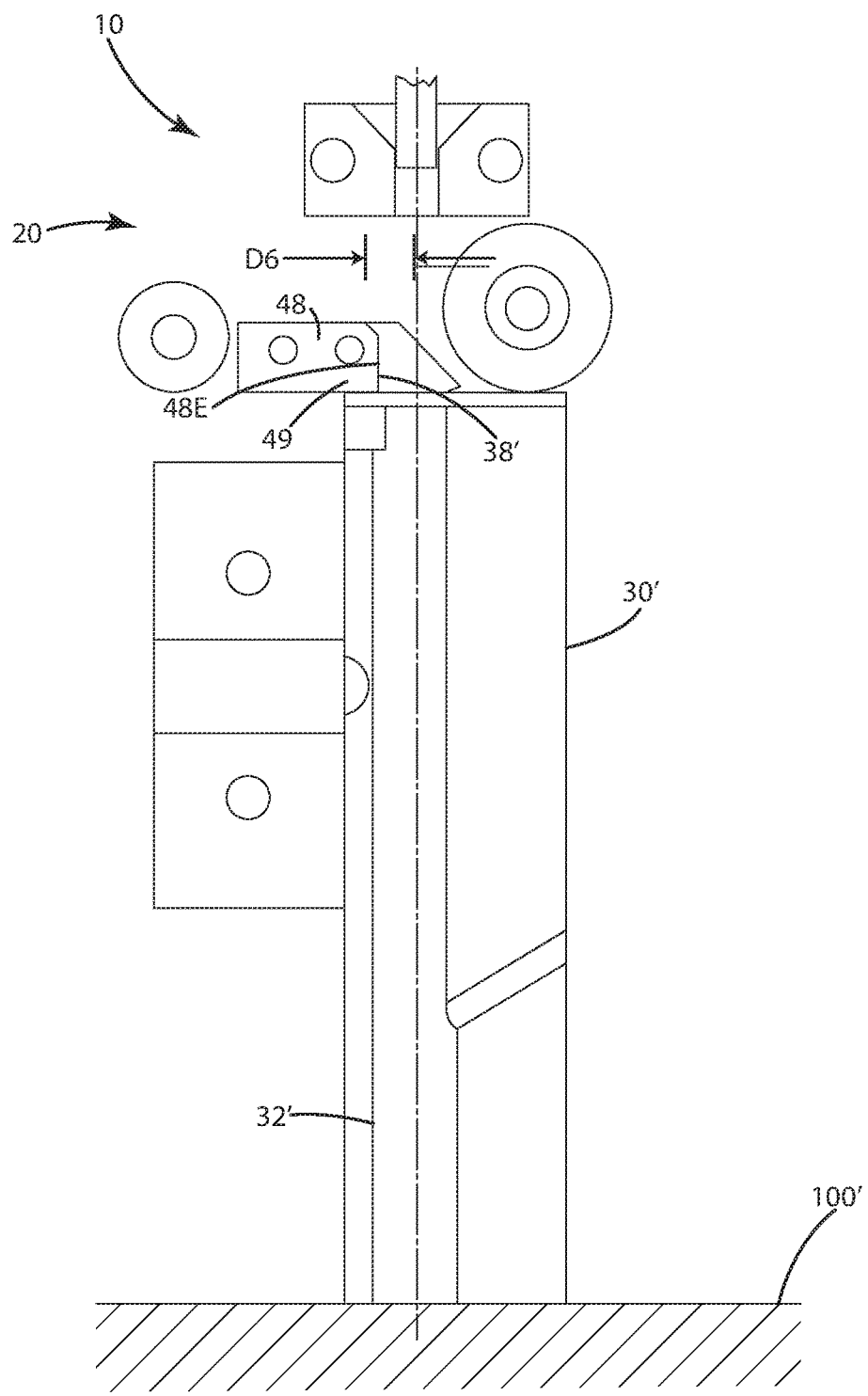
FIG. 13 is a sectional side view of the second guide being installed in a frame of the tool, showing the different setting of a fastener backstop for that second guide.

Optionally, the guide can be configured to advance a variety of different types of fasteners. For example, the guide can be configured to enable the tool to advance hidden fasteners such as those described in U.S. Pat. No. 9,120,214 to Vandenberg, which is hereby incorporated by reference in its entirety. This type of first guide is shown in FIGS. 8-10. Alternatively, the guide can be configured to enable the tool to advance face fasteners, which can be in the form of common decking screws. This type of second guide is shown in FIGS. 11-13. Optionally, different types of guides, such as the first guide and the second guide can be removed and replaced relative to the tool to provide a broad variety of fastener installation options via the tool on the job.

When replacing a first guide with a second guide, particularly where the guides are configured to advance fasteners having different sized heads, such as a first head diameter and a second head diameter larger than the first, it is helpful to ensure that the drive element 25 is consistently centered on or aligned with the drive feature of each fastener to be advanced. In some cases, if the drive feature is not properly centered on the drive feature, the drive element can misalign with the fasteners in the strip, which can lead to insufficient engagement of the drive element with the fastener, which can lead to jamming and/or misfeeding of the fasteners. To address this, guides used with the installation tool can optionally include a head size adjuster element that indexes the backstop to a proper location to accommodate specific fastener head sizes. A first guide 30, compatible with a screw having a first head size, is shown in FIGS. 8-10, and a second guide 30', compatible with another screw having a second, larger head size, is shown in FIGS. 11-13. Each of these first and second guides can include a dedicated head size adjuster element 38 and 38', respectively, which each selectively engage the backstop and move the backstop when the respective guide is installed in the tool 10.

As shown in FIG. 8, the head size adjuster element 38 is spaced a distance D7 from the rear wall 30R of the first guide 30. This head size adjuster element 38 can be in the form of a projection with a rounded and/or chamfered ramp 39 that assists in guiding the adjuster element 38 into a corresponding hole or recess 49 in the backstop 48.

As shown in FIG. 10, when this first guide 30 is installed in the tool 10, the adjuster element 38 enters the hole 49 of the backstop 48. The backstop 48 can be movably and/or slidably joined with the frame 20 via pins 29P. For example, the backstop can optionally move laterally relative to front and rear of the frame, or toward and/or away from an axis of the bore 32, depending on location of the head and size. Accordingly, with a movable backstop, when the adjuster element 38 enters the hole 49, the backstop moves or slides to align the adjuster element and the hole. This in turn moves the engagement surface 48E a specific distance D5 from the longitudinal axis LA. The specific distance D5 corresponds to the head of fasteners to be used with the guide, so that when those fasteners engage the engagement surface 48E, the drive element 25 is generally centered on the respective drive features of those fasteners. This in turn, ensures proper and sufficient engagement of the drive element with the drive feature for consistent advancement of the fastener with the drive element. In some cases, where the backstop is not indexed relative to the longitudinal axis LA to accommodate a specific head size and location of a drive feature, it is possible that the drive element might not enter or engage the drive feature sufficiently. In this off-centered condition, the drive element may be incapable of consistently advancing fasteners through the guide.

As shown in FIG. 11, the head size adjuster element 38' is spaced a distance D7 from the rear wall 30R' of the second guide 30'. This head size adjuster element 38' can be in the form of a projection with a rounded and/or chamfered ramp 39' that assists in guiding the adjuster element 38' into a corresponding hole or recess 49 in the backstop 48.

As shown in FIG. 13, when the second guide 30 is installed in the tool 10, the adjuster element 38' enters the hole 49 of the movable backstop 48. Accordingly, the backstop moves or slides to align the adjuster element and the hole. This in turn moves the engagement surface 48E a specific distance D6 from the longitudinal axis LA. The specific distance D6 corresponds to the head of fasteners to be used with the guide, so that when those fasteners engage the engagement surface 48E, the drive element 25 is generally centered on the respective drive features of those fasteners. This in turn, ensures proper and sufficient engagement of the drive element with the drive feature for consistent advancement of the fastener with the drive element.

As explained above, the tool 10 is designed to pull a strip 80 of collated fasteners through a guide so that the drive element can drive fasteners sequentially from the strip. With reference to FIGS. 1, 3 and 18-19, the strip of collated fasteners for use with the tool will now be described.

Generally the strip 80 includes a carrier 85 in which a row of a multiple fasteners 102 are disposed. The fasteners can be of any of the types described herein. For example, each of the fasteners includes a shank 107S and a head 107H. The shank can be threaded or unthreaded. The head can be the same dimension or a different dimension from the shank. As illustrated however, the head is a larger diameter than the shank diameter. The shanks of each consecutive fastener are spaced apart from one another so that the head of one fastener does not contact the shank of an adjacent fastener. Each of the fasteners can include an axis and a given length, depending on the application.

The carrier 85 as illustrated can be constructed from a polymeric material, such as polypropylene, high density polyethylene, composites, and/or frangible metals in some applications. The carrier 85 can include a leading end 81, which can terminate at a leading edge 81E, and a trailing end 82 which can terminate at a trailing edge 82E. The leading end and trailing end can be distal from one another, separated by length of the carrier 85. Optionally, the length of the carrier 85 can be such that the large number of fasteners, for example, optionally 50, 75, 100 or more, can be associated with the carrier and held by the strip 80.

The carrier can include opposing left 85L and right 85R sides that extend from the leading end to the trailing end. The carrier also can include an upper surface 85U and a lower surface 85D. Generally, when fasteners are loaded on the carrier, the heads 107H are disposed above the upper surface 85U, and the shanks 107S are disposed below the lower surface 85D. In some cases, the heads 107H can rest directly on or engage the upper surface. The upper surface can be separated from the lower surface by thickness T. This thickness optionally can be 0.001 inches to 0.1 inches, further optionally 0.01 inches to 0.1 inches, or other thicknesses depending on the material from which the carrier is made, the application tool, and the fasteners.

Figure 18:
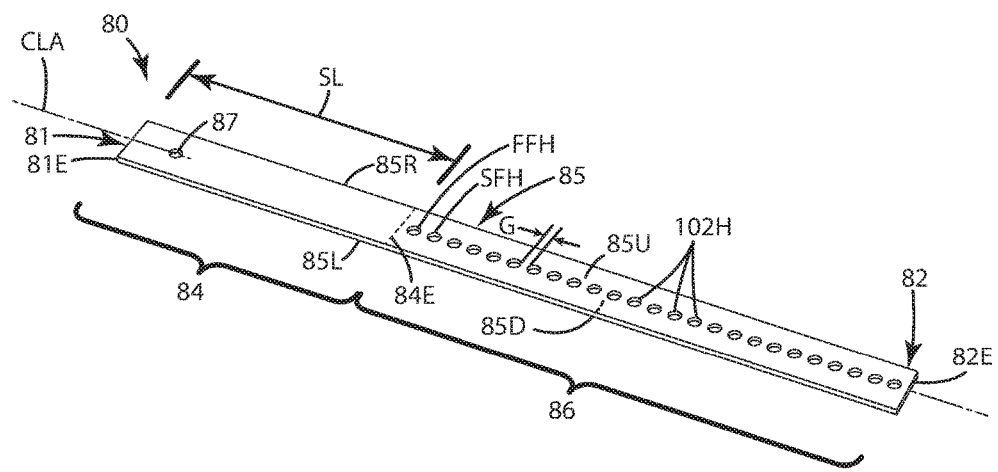
FIG. 18 is a perspective view of a carrier for a strip of collated fasteners.
Figure 19:
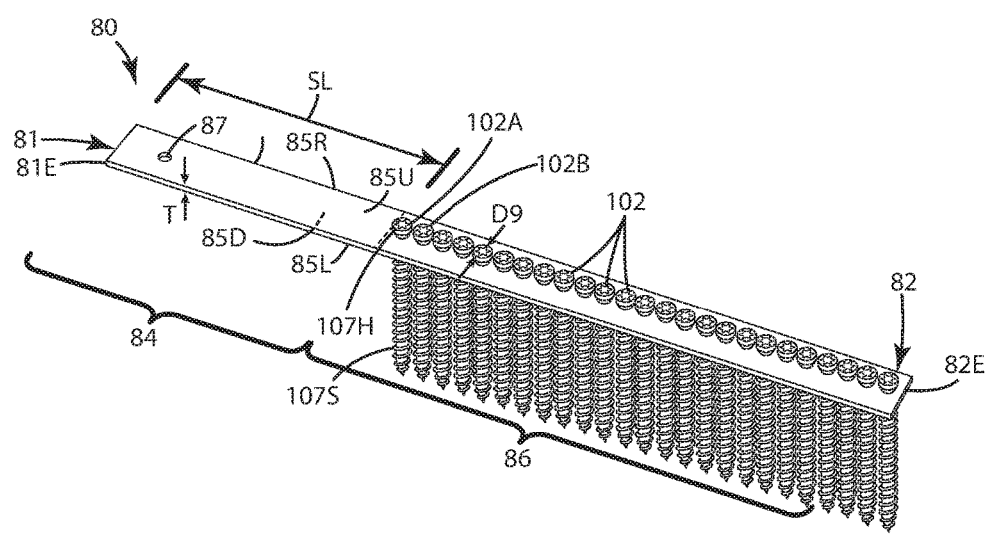
FIG. 19 is a perspective view of the carrier loaded with a plurality of first fasteners.

As shown in FIGS. 18 and 19, the strip 80 and carrier 85 can include a starter tab 84. The starter tab 84 can extend rearward from the leading edge 81E to a starter tab end 84E. The starter tab end 84E can be farther from the leading edge than it is from a first fastener hole FFH for a first fastener 102A of the multiple fasteners loaded on the carrier. The starter tab 84 can be void of any fastener holes defined therein. Further, the starter tab can be void of and not include any fasteners disposed within the starter tab, from the leading edge 81E to the starter tab end 84E. Optionally there may be zero or no fastener holes or fasteners disposed in or otherwise associated with the starter tab. Further optionally, the starter tab can be fastener hole free and fastener free in the finished state of the strip 80. In some cases however, there may be optional fastener holes in the starter tab, however these fastener holes are empty, that is they include zero or no fasteners located therein. In this construction, there still remains zero or no fasteners in the starter tab 84. Optionally, the starter tab can be incapable of supporting any of the fasteners associated with the strip therein.

The starter tab 84 can be of a length SL that is sufficient to engage the starter tab with a feeder element and move, for example, pull a remaining portion of the carrier, for example, the loaded portion 86 of the strip 80. This length SL can extend from the leading edge 81E to the starter tab end 84E, or generally short of the first fastener hole FFH. The length SL can be optionally at least ¼ inch, further optionally at least ½ inch, even further optionally at least ¾ inch, yet further optionally at least 1 inch, even further optionally 1½ inches, still further optionally 2 inches, even further optionally 3 inches or more depending on the application and the configuration of the tool with which the strip is used. Further optionally, the length SL of the starter tab 84 can be greater than any gap G that is between immediately adjacent fastener holes 102H defined in the loaded portion 86 of the strip.

The starter tab 84 can include a feeder element attachment, which as shown is in the form of a feeder element aperture 87. In other constructions, the feeder element attachment can be in the form of a projection, such as a hook. The feeder element attachment can be adapted to join with a feeder of a tool to move the strip 80 through the tool, and in particular, through a guide of the tool. The feeder element aperture 87 can extend from the lower surface 85D to the upper surface 85U, completely through the carrier. The feeder element aperture can be defined rearward from the leading edge 81E. It also can be disposed inward from the left and right sides 85L and 85R. In this manner the feeder element aperture can be bounded on all sides by the carrier and completely circumferentiated or surrounded by the carrier.

Optionally, the feeder element aperture 87 can be closer to the leading edge 81E than a first or lead fastener 102A and/or a first fastener hole FFH is to the leading edge 81E. Further optionally, the feeder element aperture 87 can be sized and dimensioned to receive a feeder element pin therethrough so that a feeder element can move the carrier through a guide of an installation tool.

The starter tab 84 can be of sufficient tear strength to withstand engagement, such as pulling or other movement, of the carrier by an installation tool to sequentially advance the fastener through a guide of the installation tool. For example the starter tab can withstand optionally at least 5 pounds of pulling force, further optionally at least 10 pounds of pulling force, even further optionally at least 15 pounds of pulling force, yet further optionally at least 20 pounds of pulling force, even further optionally at least 25 pounds of pulling force to pull the carrier through the installation tool.

The carrier 85 as mentioned above can include a remaining portion 86, which also can be referred to as a loaded portion of the carrier and/or strip. This remaining portion or loaded portion is where all the fasteners 102 of the strip can be disposed. Optionally, all of the fasteners are disposed only in the remaining portion or loaded portion, generally between the starter tab 84 and trailing edge 82E. Further optionally, all fasteners can be disposed only between the starter tab end 84E and the trailing edge 82E.

This remaining portion or loaded portion defines the multiple fastener holes 102H. The first of these fastener holes 102H is a first fastener hole FFH that is configured to receive a first or lead fastener 102A. The next hole is a second fastener hole SFH that is configured to receive a second fastener 102B, and so on. The first fastener hole and lead fastener are the closest of the holes and fasteners to the leading edge 81E and/or the leading end 81. Generally however, the feeder element aperture 87 or attachment element is closer to the leading edge than the lead fastener and the first fastener hole.

Fastener holes 102H are all also spaced from one another by a gap G. This gap G can be less than the diameter D9 of each of the respective heads of the fasteners. Optionally, the gap G can be small enough so that each head of each fastener touches an adjacent head of an adjacent fastener when carried on the strip 80. In other cases, the heads of respective adjacent fasteners can be distanced from one another. The gap G can correspond to a first distance of separation between adjacent fastener holes. This can be contrasted with a second distance that separates a first fastener hole FFH from the feeder element aperture 87. In some cases, the second distance can be optionally at least greater than 100% of the first distance, further optionally at least 150% of the first distance, even further optionally at least 200% of the first distance, yet further optionally at least 250% of the first distance, still further optionally at least 300% of the first distance. Further optionally, the first distance can be less than or equal to the diameters of individual heads of the fasteners on the strip, while the second distance can be greater than those diameters. Even further optionally, the first distance, that is the gap G, can be of a dimension that is less than a head diameter D9 of individual fasteners on the strip.

As shown in FIGS. 18 and 19, the strip and in particular, the carrier, defines no notches, recesses or cutouts in the respective left and right sides 85L and 85R. When the strip 80 is attached to the installation tool 10 described above, such notches are irrelevant, as they do not assist in movement of the carrier through the tool. Of course, the strip 80 can be used in other types of installation tools. These other installation tools can utilize a pusher feeder. In this case, the pusher feeder can include teeth that engage notches. Accordingly, the strip 80 optionally can be outfitted with a plurality of notches, recesses and/or cutouts or apertures adjacent the sides of the carrier 85 to facilitate use with these types of tools.

Figure 20:
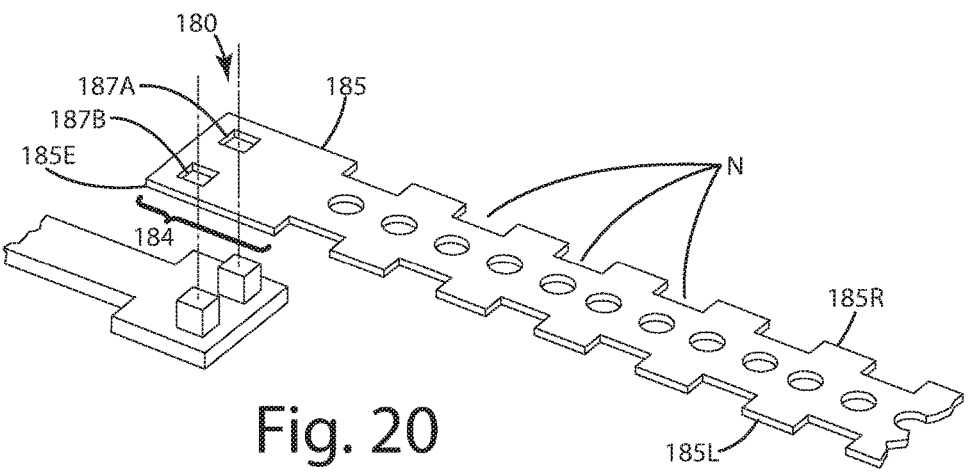
FIG. 20 is a perspective view of an alternative carrier loaded with a plurality of second fasteners.

An alternative embodiment of the strip is shown in FIG. 20 and generally designated 180. This embodiment is similar to the strip embodiment above in structure, function and operation with several exceptions. For example, this strip 180 includes a carrier 185 that defines a plurality of notches in the respective sides 185R and 185L of the carrier 185. These notches can be used in conjunction with a tool having a pusher feeder or other guide system that utilizes the notches. The strip 180 also can include a starter tab 184 which is of a much shorter length than the starter tab noted above. The starter tab can define more than one feeder element aperture 187A, 187B to join with an attachment element of a feeder system. These feeder apertures can be polygonal or square, rather than cylindrical or round, as with the embodiment above.

Figure 20A:
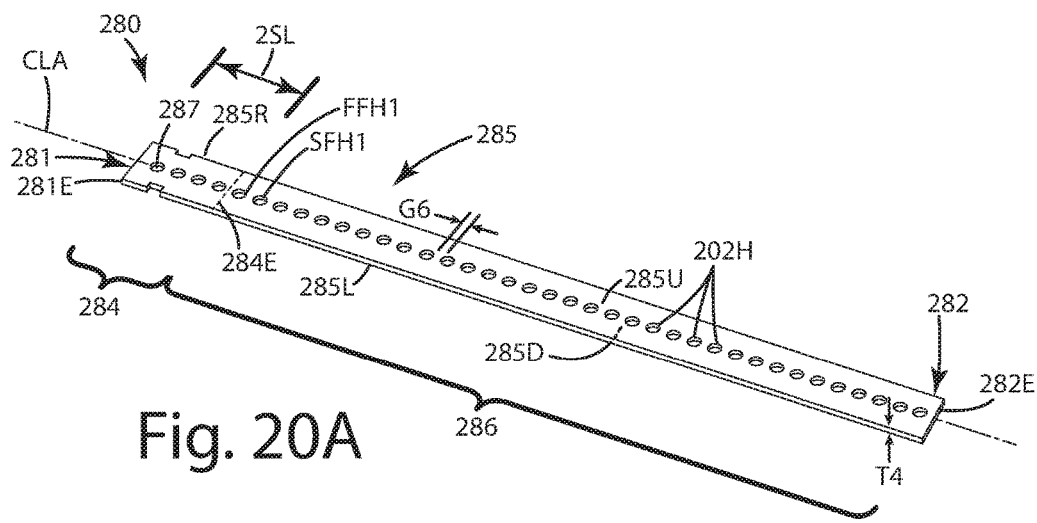
FIG. 20A is a perspective view of another alternative carrier for a strip of collated fasteners.
Figure 20B:
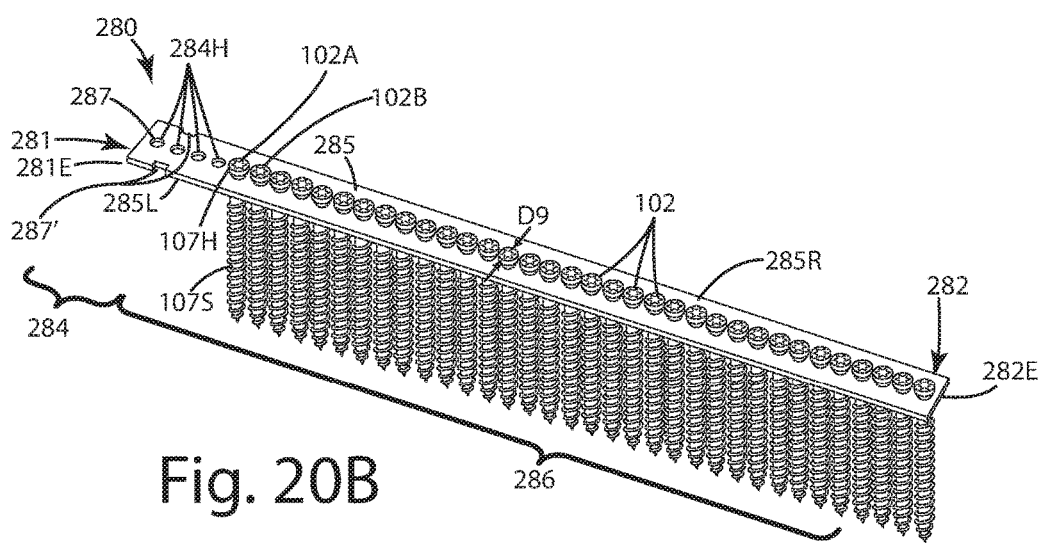
FIG. 20B is a perspective view of the other alternative carrier loaded with a plurality of first fasteners.
Figure 20C:
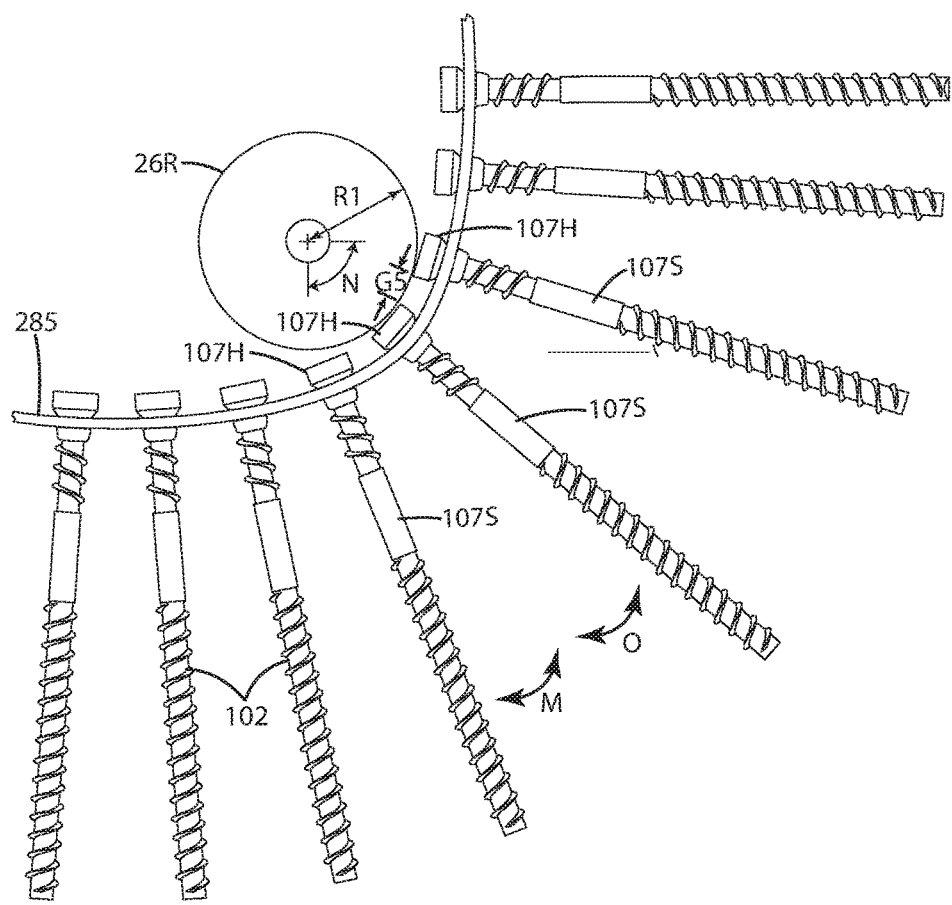
FIG. 20C is a side view of the other alternative carrier traversing about a radiused element of a tool.

Yet another alternative embodiment of the strip is shown in FIGS. 20A, 20B and 20C, and generally designated 280. This embodiment is similar to the strip embodiments above in structure, function and operation with several exceptions. For example, this strip 280 includes a carrier 285 in which a row of a multiple fasteners 102 are disposed. The fasteners can be of any of the types described herein, or optionally of the type described in U.S. Pat. No. 8,382,414 to Vandenberg, which is incorporated by reference in its entirety. For example, each of the fasteners includes a shank 107S and a head 107H. The shank can be threaded or unthreaded or both. In regions where unthreaded, the shank can have a diameter of optionally 0.100 inches to 0.175 inches, further optionally 0.110 inches to 0.150 inches, even further optionally 0.115 inches to 0.130 inches, and yet further optionally about 0.120 inches. The head can be the same dimension or a different dimension from the shank. As illustrated however, the head is a larger diameter than the shank diameter. For example, the head can have a diameter of optionally 0.175 inches to 0.300 inches, further optionally 0.180 inches to 0.250 inches, even further optionally 0.195 inches to 0.210 inches, further optionally 0.120 inches to 0.200 inches, yet further optionally about 0.200 inches.

The shanks of each consecutive fastener can be spaced apart from one another along the carrier 285 so that the head of one fastener does not contact the head or shank of an adjacent fastener, even when traversing a radiused element. For example, as shown in FIG. 20C, the individual fasteners 102 are spaced a distance from one another so that, when traversing a radiused element, such as a roller 26R having a rounded outer surface as shown, the adjacent fastener heads 107H optionally contact the outer surface 26RS of the roller, but the adjacent heads optionally do not contact one another when the carrier is bent around that radiused element. That radiused element can have a radius R1 of optionally 1 inch to 2.5 inches, further optionally 1 inch to 2 inches, even further optionally 1.5 inches to 1.75 inches. Optionally, the carrier can space the heads 107H so that adjacent heads on the carrier, when traversing the radiused element about an angle N of 45° to 90°, have a gap G5 between one another. This angle N can be optionally 30° to 120°, further optionally 45° to 90°. This gap G5 can optionally be 0.001 inches to 0.200 inches, further optionally 0.100 inches to 0.175 inches, and even further optionally about 0.110 inches to 0.160 inches. This gap G5 can be less than a gap G6 between adjacent fastener heads when the carrier is in a flat or generally planar configuration as shown in FIGS. 20A and 20B, described further below.

Further optionally, the carrier can be configured so as to space the fasteners with the adjacent heads barely contacting one another, but not enough to exert forces against one another to cause the respective shanks 107S to cant off at angles M or O (measured into and out from the plane of the paper of FIG. 20C) that are optionally greater than 10°, and further optionally greater than 25°, so that the shanks and fasteners will not enter the feed slot of a guide described herein.

The carrier 285 as illustrated can be constructed from a polymeric material, such as polypropylene, high density polyethylene, composites, and/or flexible metals in some applications. The carrier can be a single layer of material having a single, continuous thickness throughout, optional even adjacent the holes 202H that receive the fasteners. For example, the area of the carrier adjacent the holes might not include any cups, flanges, material or extra layers that extend down from a generally planar lower surface 285D, for example adjacent the holes 202H. This optionally can be different from conventional collated fastener strips which have such cups and flanges around the holes to stabilize and direct the screws of those strips because the tool used with those screws does not have the centering capability of the present tools described herein. Thus, there, extra structure is used with those conventional collated strips for a purpose that is optionally irrelevant in the embodiments described herein.

The carrier can be of a variety of lengths. For example, the carrier can be optionally about 12 inches to 36 inches, further optionally about 18 inches to 24 inches, and even further optionally about 22 inches in length from end to end or leading edge to trailing edge. The carrier can also include a width extending from the right side 285R to the left side 285L that can be optionally 0.250 inches to 1.000 inches, further optionally 0.400 inches to 0.800 inches, even further optionally 0.600 inches to 0.750 inches, and even further optionally 0.625 inches.

More particularly, the carrier 285 can include a leading end 281, which can terminate at a leading edge 281E, and a trailing end 282 which can terminate at a trailing edge 282E. The leading end and trailing end can be distal from one another, separated by length of the carrier 285, as described above. Optionally, the length of the carrier 285 can be such that the large number of fasteners, for example, optionally at least 40, at least 50, at least 60, at least 75, at least 80, at least 100 or more, can be associated with the carrier and held by the strip 280. In some cases, the screws can be placed at specific intervals along the carrier so that the screws have a specific frequency along the length of the carrier. Optionally, with the screws described herein, the carrier can include screws at an average frequency of optionally at least 2 screws per inch, further optionally at least 2.5 screws per inch, even further optionally at least 3 screws per inch, yet further optionally at least 3.5 screws per inch, and yet further optionally at least 4 screws per inch. Where the length of the carrier is 22 inches, the screws can populate the carrier with optionally at least 40 screws in that length, further optionally at least 45 screws in that length, even further optionally at least 50 screws in that length, yet further optionally at least 55 screws in that length, even further optionally at least 60 screws in that length, and yet further optionally 80 screws in that length.

The carrier can include opposing left 285L and right 285R sides that extend from the leading end to the trailing end. The carrier also can include an upper surface 285U and a lower surface 285D. These upper and lower surfaces optionally can be substantially flat or planar (when the carrier is laid flat) with no projections, screw cups or other components, except for the fasteners extending away from or out from the upper or lower surfaces. Generally, when fasteners are loaded on the carrier, the heads 107H are disposed entirely above the upper surface 285U, and the shanks 107S are disposed in the holes and below the lower surface 285D. In some cases, the heads 107H can rest directly on or engage against the upper surface, but optionally the heads do not extend into the holes until the fasteners are driven by the tool. The upper surface can be separated from the lower surface by thickness T4. This thickness optionally can be 0.001 inches to 0.100 inches, further optionally 0.010 inches to 0.100 inches, yet further optionally 0.040 inches to 0.060 inches or other thicknesses depending on the material from which the carrier is made, the application tool, and the fasteners. Optionally, this thickness can be consistent and uniform throughout the carrier, from end to end and side to side, except where there is no thickness, for example, where the holes 202H are defined in the carrier.

Each of the fastener holes 202H can be spaced from one another a gap G6 along the carrier 285. This gap G6 can be less than the diameter D10 of each of the respective heads 107H of the fasteners. Optionally, the gap G6 can be small enough so that each head of each fastener barely contacts an adjacent head of an adjacent fastener when carried on the strip 280. As shown in FIGS. 20A-20B, the heads of respective adjacent fasteners can be distanced from one another. The gap G6 can correspond to a first distance of separation between adjacent fastener holes. This can be contrasted with a second distance that separates a first fastener hole FFH1 from the feeder element aperture 287 disposed adjacent the leading end 281 and leading edge 281E. In some cases, the second distance can be optionally at least greater than 100% of the first distance, further optionally at least 150% of the first distance, even further optionally at least 200% of the first distance, yet further optionally at least 250% of the first distance, still further optionally at least 300% of the first distance. Further optionally, the first distance can be less than or equal to the diameters of individual heads of the fasteners on the strip, while the second distance can be greater than those diameters. Even further optionally, the first distance, that is, the gap G6, can be of a dimension that is less than a head diameter D10 of individual fasteners on the strip.

Figure 20D:
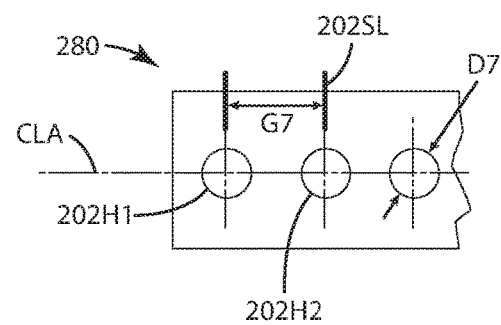
FIG. 20D is a close-up view of holes defined by the other alternative carrier and optional slits adjacent the holes.

The relationship of the hole 202H spacing along the carrier 285 can be described in connection with the centers of each of the holes as well. For example, as shown in FIG. 20D, adjacent holes 202H1 and 202H2, each can have geometric centers that are separated by a distance or gap G7. This distance G7 optionally can be greater than the diameters D10 of the heads 107H of fasteners stored on the strip 280. For example, the distance G7 optionally can be 0.210 inches to 0.300 inches, further optionally 0.220 inches to 0.275 inches, even further optionally 0.220 inches to 0.260 inches, yet further optionally 0.201 inches to 0.260 inches. The diameter of the heads optionally can be less than these distances. In some cases the heads diameters can be 0.200 inches, or other diameters described herein.

Each of the holes 202H also can have a particular diameter D7. This diameter can be slightly less than the diameter of the unthreaded part of the shank 107S of the respective fasteners on the strip. For example, the diameter D7 can be optionally 0.001 inches less than the diameter of the shank, further optionally 0.010 inches less than the diameter of the shank, even further optionally 0.050 inches less than the diameter of the shank. With the diameter of the holes less than the diameter of the shank, when the shanks are inserted into the holes as shown in FIG. 20B, the carrier can exert a friction fit on the shanks to hold them securely fixed thereto. In some cases, the holes can be slightly larger than the diameter of the shanks where an amount of slop is suitable for the application, or where a large driver is used for advancing the screws, in which case the driver can be easily withdrawn from the hole after advancing a fastener therethrough.

As shown in FIG. 20D, the strip 280 optionally can define one or more minute slits 202SL adjacent and optionally contiguous with the holes themselves. As shown, the slits are oriented substantially perpendicular, that is 85° to 95°, relative to the longitudinal axis CLA of the carrier. This angle of the slits can be such that when the carrier is pulled along by an installation tool described herein, the forces exerted on any given fastener, when registered in the guide, do not cause that fastener to slide into the slit, partially out from the respective holes, and tear or substantially weaken the strip in that region. In some cases, this could be the case if the slit was more open and offset 45° from the centerline CLA.

As shown in FIGS. 20A and 20B, the carrier can be void of relief apertures adjacent the holes. For example, the carrier can be configured so there are no additional apertures extending through all or part of the thickness T4 of the carrier 285 adjacent the holes, to allow a fastener head to pass through the carrier, through the hole when the fastener is advanced in a driving operation. The respective holes that receive the fasteners optionally can be the only holes passing through the carrier adjacent or around the fasteners. This can be the case with the current embodiments where the heads of the fasteners are relatively small, as described herein. Accordingly, the heads easily pass through the carrier, from the upper surface, down through the respective hole, and beyond the lower surface during advancement of the same.

As shown in FIGS. 20A and 20B, the strip 280 and carrier 285 can include a starter tab 284. The starter tab 284 can extend rearward from the leading edge 281E to a starter tab end 284E. The starter tab end 284E can be closer to a first fastener hole FFH1 for a first fastener 102A, than to the leading edge 281E of the carrier. The starter tab end 284E optionally can be closer to the leading edge 281E than the first fastener hole FFH1 within which a first fastener 102A is disposed. The starter tab 284 can define fastener holes 284H therein, however, in a finished carrier strip, ready to be installed in a tool, these holes 284H are vacant, and without any fasteners disposed therein. Of course, in some cases the holes 284H can be absent from the starter tab altogether. Optionally, there are no fasteners disposed within or included in the starter tab, from the leading edge 281E to the starter tab end 284E. Further, the starter tab can be continuous with the remaining portion 286 so there is no visible end where these elements transition to one another.

As mentioned above, there may be zero or no fastener holes or fasteners disposed in or otherwise associated with the starter tab, or more generally, the starter tab can be fastener hole free and fastener free in the finished state of the strip 280. In some cases however, there may be optional fastener holes in the starter tab, however these fastener holes are empty, that is they include zero or no fasteners located therein. In this construction, there still remains zero or no fasteners in the starter tab 284. Optionally, the starter tab can be incapable of supporting any of the fasteners associated with the strip therein.

The starter tab 284 can be of a length 2SL that is sufficient to engage the starter tab with a feeder element and move, for example, pull a remaining portion of the carrier, for example, the loaded portion 286 of the strip 280. This length 2SL can extend from the leading edge 281E to the starter tab end 284E, or generally short of the first fastener hole FFH1, or to the center of the first fastener hole FFH1. The length 2SL can be optionally at least ¼ inch, further optionally at least ½ inch, even further optionally at least ¾ inch, yet further optionally at least 1 inch, even further optionally 1½ inches, still further optionally 1¾ inches to 2 inches, even further optionally 3 inches or more depending on the application and the configuration of the tool with which the strip is used. Further optionally, the length 2SL of the starter tab 284 can be greater than any gap G6 that is between immediately adjacent fastener holes 202H defined in the loaded portion 286 of the strip.

The starter tab 284 can include a feeder element attachment, which as shown is in the form of a feeder element aperture 287, which can be identical in size and shape to the other fastener holes defined by the carrier 285. In other constructions, the feeder element attachment can be in the form of a projection, such as a hook. The feeder element attachment can be adapted to join with a feeder of a tool to move the strip 280 through the tool, and in particular, through a guide of the tool. The feeder element aperture 287 can extend from the lower surface 285D to the upper surface 285U, completely through the carrier and its thickness. The feeder element aperture can be defined rearward from the leading edge 281E. It also can be disposed inward from the left 285L and right 285R sides. The feeder element aperture can be separated from the first fastener hole FFH1, which is occupied by a first fastener 102A, with 1, 2, 3, 4, 5, 6 or more empty holes between that feeder element aperture and the first fastener hole within which a fastener is disposed. In this manner, the feeder element aperture can be bounded on all sides by the carrier and completely circumferentiated or surrounded by the carrier.

Optionally, as shown in FIGS. 20A and 20B, the feeder element aperture can be in the form of one or more notches or recesses 287' defined in one or more of the respective left 285L and right 285R sides of the carrier. These notches can be rectangular as shown, or some other shape, such as polygonal, triangular, rounded, partially circular or other shapes. The notches can extend through the thickness of the carrier from the upper surface to the lower surface. With these notches, the other fastener holes in the starter tab optionally can be deleted, with the first fastener holes FFH1 being the closest hole, other than the notches, to the leading edge 281E.

As shown in FIG. 20B, the feeder element aperture 287 or 287' can be closer to the leading edge 281E than a first or lead fastener 102A and/or a first fastener hole FFH1 is to the leading edge 281E. Further optionally, the feeder element aperture 287 or 287' can be sized and dimensioned to receive a feeder element pin or pins therethrough so that a feeder element can move the carrier through a guide of an installation tool.

The starter tab 284 can be of sufficient tear strength to withstand engagement, such as pulling or other movement, of the carrier by an installation tool to sequentially advance the fastener through a guide of the installation tool. For example the starter tab can withstand optionally at least 5 pounds of pulling force, further optionally at least 10 pounds of pulling force, even further optionally at least 15 pounds of pulling force, yet further optionally at least 20 pounds of pulling force, even further optionally at least 25 pounds of pulling force to pull the carrier through the installation tool.

The carrier 285 as mentioned above can include a remaining portion 286, which also can be referred to as a loaded portion of the carrier and/or strip. This remaining portion or loaded portion is where all the fasteners 102 of the strip can be disposed. Optionally, all of the fasteners associated with the carrier or strip can be disposed only in the remaining portion or loaded portion, between the starter tab 284 and trailing end 282. Further optionally, all fasteners can be disposed only between the starter tab end 284E and the trailing edge 282E.

This remaining portion or loaded portion defines the multiple fastener holes 202H. The first of these fastener holes 202H is a first fastener hole FFH1 that is configured to receive a first or lead fastener 102A. The next hole is a second fastener hole SFH1 that is configured to receive a second fastener 102B, and so on. The first fastener hole and lead fastener are the closest of the holes and fasteners to the leading edge 281E and/or the leading end 281. Generally however, the feeder element aperture 287 and 287' or attachment element is closer to the leading edge than the lead fastener and the first fastener hole.

As shown in FIGS. 20A-20C, the strip and in particular, the carrier, optionally defines no notches, recesses or cutouts in the respective left 285L and right 285R sides, except for the optional one or more feeder element apertures 287' in the form of notches. Optionally, the carrier defines no notches, recesses or cutouts in the respective left 285L and right 285R sides along a majority of a length of the carrier. Further optionally, the carrier defines no notches, recesses or cutouts in the respective left 285L and right 285R sides along the remaining portion on a majority of the remaining portion. Yet further optionally, the carrier defines no notches, recesses or cutouts in the respective left 285L and right 285R sides along the strip between the starter tab and the trailing edge. When the strip 280 is attached to the installation tool 10 described above, such additional notches beyond the optional apertures 287' are irrelevant, as they do not assist in movement of the carrier through the tool. Of course, the strip 280 can be used in other types of installation tools. These other installation tools can utilize a pusher feeder. In this case, the pusher feeder can include teeth that engage notches. Accordingly, the strip 80 optionally can be outfitted with a plurality of notches, recesses and/or cutouts or apertures at predetermined intervals adjacent the sides of the carrier to facilitate use with these types of tools.

As shown in FIG. 20B, the carrier 285 can be void of notches, recesses and/or cutouts or apertures along the respective sides 285R and 285L of the carrier 285, which otherwise could be used in conjunction with a tool having a pusher feeder or other guide system that utilizes the notches. The carrier 285 optionally can be void of notches, recesses and/or cutouts or apertures, other than the feeder element apertures 287' in the starter tab 284. The carrier further optionally can be void of notches, recesses and/or cutouts or apertures along the respective sides 285R and 285L in the regions adjacent fasteners when the carrier strip carries those fasteners. In some cases, notches, recesses and/or cutouts or apertures can be defined in the respective sides 285R and 285L but merely for aesthetic or non-functional reasons. In these cases, the carrier is still considered to be void of notches, recesses and/or cutouts or apertures defined in the respective sides 285R and 285L.

A method of operating the tool and collated fastener strip will now be described in connection with FIGS. 2-7. Generally, the method can include pulling on a strip 80 of collated fasteners at a location downstream D of a guide 30, the strip including a carrier 85 and multiple fasteners, and advancing a first fastener into a workpiece 100.

The method can include attaching a drive tool 109, for example a variable speed drill, to the tool 10. Because the tool can be separately constructed from the drive tool, various different power tools and drills can be used to run the tool 10 of the current embodiment. This provides enhanced flexibility and versatility. The power tool 109 can be attached to the drive element 25 of the tool 10. In this manner, the rotational force generated by the power tool 109 can be translated to the drive element 25 to rotate a fastener when disposed in the guide 30.

With the drive tool 109 is attached the tool 10, the user optionally can adjust the depth of drive to set the particular distance D2, D3 at which the fastener 102 is advanced into a workpiece 100 as shown in FIGS. 15A and 17A. As mentioned above this can be accomplished by rotating the handle 50H to set the block 54 a particular level relative to the frame 20. The block 54 will stop advancement of the power tool and/or the drive element toward the guide 30, thereby setting the fastener drive depth. Of course, where there is no depth of drive adjuster, this adjustment can be absent.

The strip 80 of collated fasteners can be loaded in the tool. The strip, and in particular, the carrier 85, can be installed in the guide channel 20C, with the fasteners 102 projecting out therefrom. The sides 85R and 85L of the carrier can be constrained and passively guided within the channel 20C. The starter tab 84 however can extend beyond the guide channel 20C. The starter tab 84 and the leading end 82 and edge 82E can be pushed, pulled or otherwise moved initially beyond the guide 30 and/or the drive element 25 by the user. Optionally, the starter tab can be extended by the user past the backstop 48 and past the bore 32 of the guide. Generally however, the loaded portion 86 of the strip 80 does not extend beyond or past the backstop and/or the bore.

The user can pull on the strip 80 in the downstream D direction until the first fastener 102A in the loaded portion 86 enters the guide 30 through the opening 36. The head of the fastener can engage the engagement surface 48E of the backstop 48. When the carrier is under tension, this can pull the shaft and the portion of the fastener under the carrier in general against the guide wall 34.

The user can pull on the elongated member 42 to counter the force of the biasing member 43 in the tension feeder 40. The user can do so by grasping the attachment element 45, and in particular, the grasping portion 46, and pulling that portion away from the upper end 22 toward the lower end 21 until the grasping portion achieves a suitable position. For example, as shown in FIG. 2, as the elongated member is pulled, it uncoils coils from a roll. During the pulling, the elongated member remains under tension and is urged toward the tensioner spring 43 at the upper end of the frame 20.

With the elongated member extended, the attachment element 47, for example the pin, can be inserted through the feeder element aperture 87 of the carrier 85. This in turn secures the tension feeder 40 generally to the strip 80. The user can then release the elongated member and the strip, at which point the tension feeder 40 immediately exerts a pulling force on the starter tab 84 so that the carrier between the leading edge and the first fastener is placed under a tension by the tension feeder.

As discussed above, the tension on the strip, in particular the starter tab, pulls the head 103 of the first fastener as shown in FIG. 5 against the backstop 48, and in particular the engagement surface 48E. The backstop stops or arrests movement of the fasteners and/or the strip along the collated fastener path so that a shank or tip of the fastener swings into alignment with the bore. The carrier, pulling on the fastener below the head, creates a moment M, as shown in FIG. 5A. The moment M can assist in tilting or swinging the shank 107 or other portion of the fastener below the carrier against the guide wall 34 and generally into alignment with the bore 32 and its longitudinal axis.

As also discussed above, the tension exerted by the feeder element can be exerted on the starter tab generally between the leading end 81 and the first fastener or between the leading end 81 and any subsequent fastener after the first fastener is advanced by the tool. The tension T may not be exerted upstream U of the first fastener or the drive element 25 in general. In this manner, the carrier 85 in the loaded portion 86 might not be placed under a tension or pulling force and can be passively held in place adjacent the tool. Further, the loaded portion or remaining portion can be passively held, and under no pushing or other force that advances the strip 80 past the drive element 25. This can occur even though the starter tab remains under tension. In this case, a first portion of the carrier or strip is under a tension force, while a remainder or second portion upstream of the guide is not under a tension force. Thus, the carrier or strip can be under different tensions in different portions thereof, for example, a first tension in a forward portion such as the starter tab, and a second lesser tension in a portion rearward of the starter tab, which tension might be zero.

With the head of the first fastener brought into contact with the backstop, the drive feature 103 of the fastener is aligned with the drive element 25. The fastener itself is also aligned with the bore 32 of the guide 30. The user can begin to advance the drive element 25 to engage the fastener 102A as shown in FIG. 5. To do so, the user can move the power tool, which is connected to the drive element, toward the nose and/or guide of the tools. The power tool 109 can be actuated to rotate the drive element within the frame 20.

Figure 6:
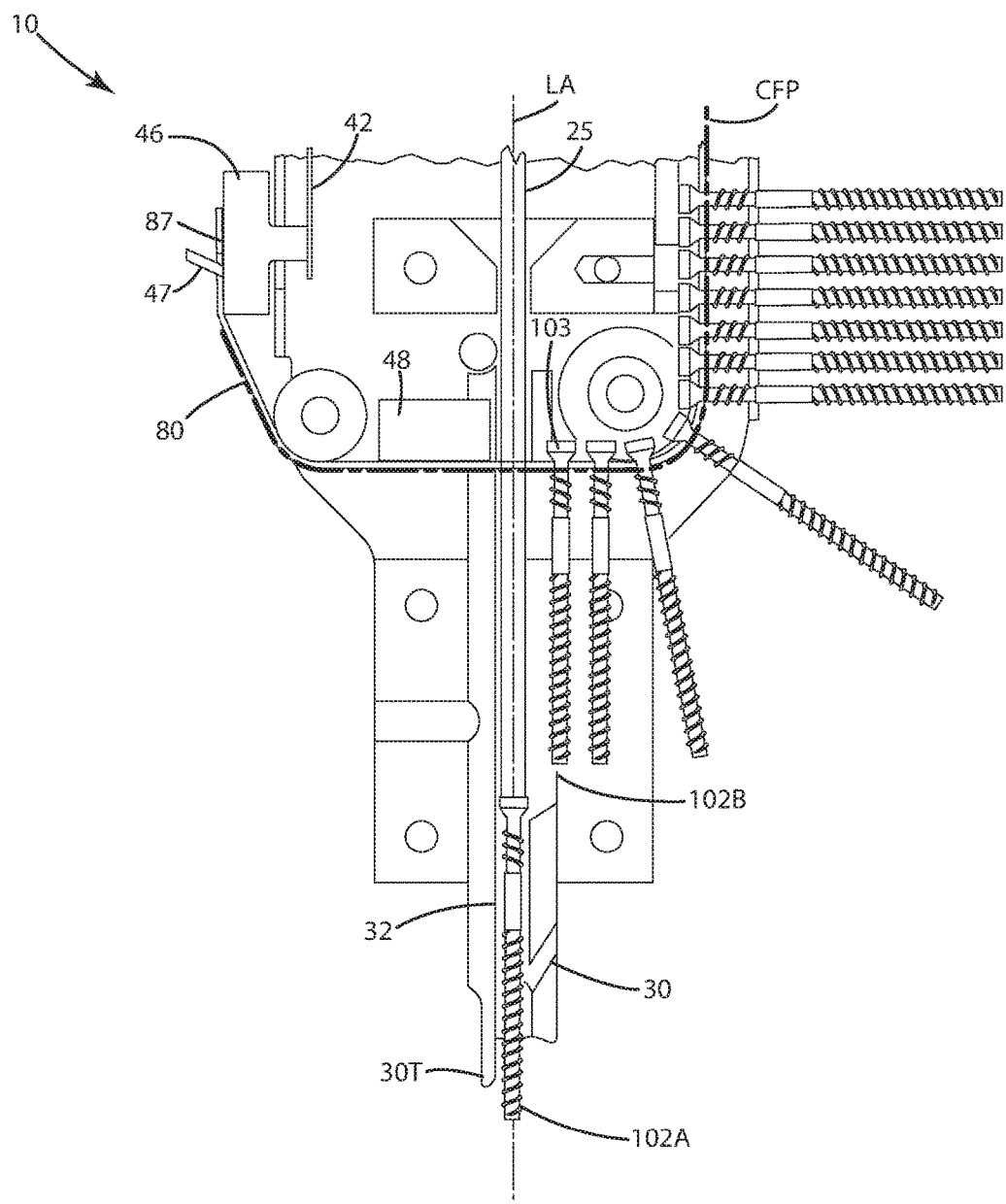
FIG. 6 is a sectional side view of the tool with the tool advancing the fastener from the strip of collated fasteners.

During the advancement, shown in FIG. 6, the drive element 25 sufficiently engages the drive feature of the first fastener 102A feature to rotate the fastener and push it through the fastener hole and subsequently out of connection with the carrier 85. The drive element extends through the fastener hole in which the first fastener 102A was previously disposed and continues to advance the first fastener through the guide 30, through the bore 32 and into a workpiece 100.

The depth of drive of the fastener as mentioned above can be previously set by the depth of drive adjuster 50.

After the fastener is advanced, the user retracts the drive tool 109, which in turn retracts the drive element 25 upward toward the upper end of the frame 20. Eventually, the tip of the drive element is withdrawn from the carrier strip and in particular the first fastener hole FFH.

Figure 7:
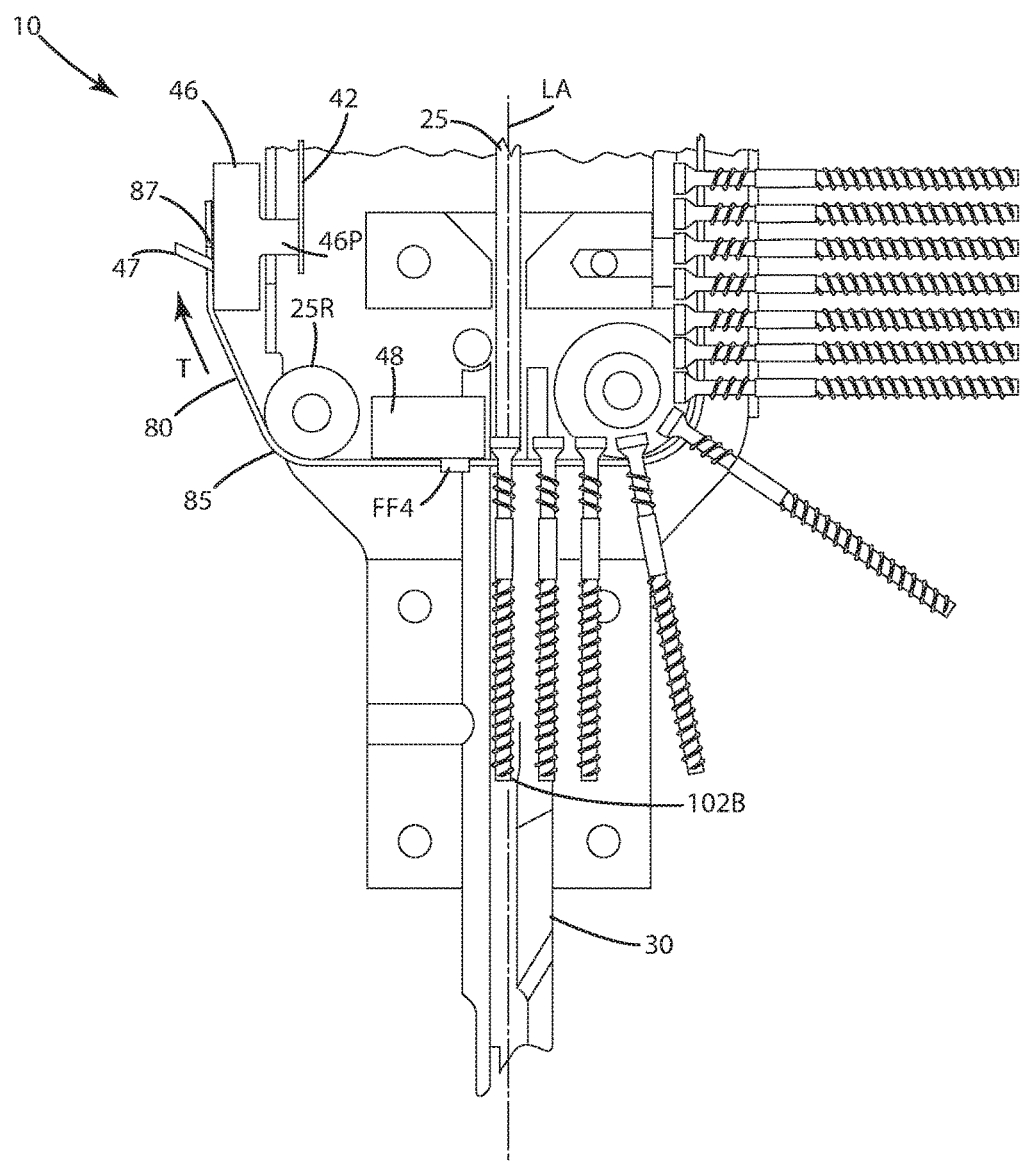
FIG. 7 is a sectional side view of the tool with the tool in a retracted mode, with the tension feeder pulling the next, successive fastener into alignment with a guide of the tool.

Due to the tension T exerted by the tension feeder on the strip 80, as shown in FIG. 7, the tension feeder automatically pulls under tension (without further movement or action by the user) the carrier 85 and strip 80 to move the same along the collated fastener path CFP. In so doing, the second fastener 102B engages the backstop 48 and aligns with the bore 32 as described above in connection with the first fastener. The advancing of the second fastener can proceed as described above in connection with the first fastener. This procedure can be repeated multiple times until all of the fasteners of the strip in the loaded portion are installed or the job is complete.

The tension feeder continues to pull the strip until the last fasteners advanced from the strip. Optionally, the tension feeder can pull the trailing end 82 through the guide 30. The user can remove the empty carrier at this point and install another strip of collated fasteners. If the user desires to install a different type of fastener, the user can swap out the guide 30 for another guide, such as the guide 31 to install face screws into a workpiece. Of course, with the embodiments described above, when the other guide is installed, and associated head size adjuster element can move the backstop accordingly and promote consistent and appropriate alignment of the drive element 21 with a drive feature of the different screw.

A first alternative embodiment of the tool is shown in FIGS. 21-31 and generally designated 110. This embodiment of the tool is similar and/or identical to the current embodiments described above in structure, function and operation, with several exceptions. For example, the tool 110 includes a first end, also referred to as a lower end and/or an installation end 121 that is distal from the second end, also referred to as an upper end or drive end 122. The installation end, like the embodiments above is where the guide 130 is located, and where fasteners are installed by the tool into a workpiece. The guide can be similar to the guide of the above embodiment in most regards except as described below. The drive end, like the embodiment above, is where the tool 110 interfaces with a drive tool 107 at the drive tool's chuck 109 or drive component as described below. As illustrated, the drive end 122 also includes a handle 150H, which can be joined directly to the frame 120 of the tool 110.

Figure 21:
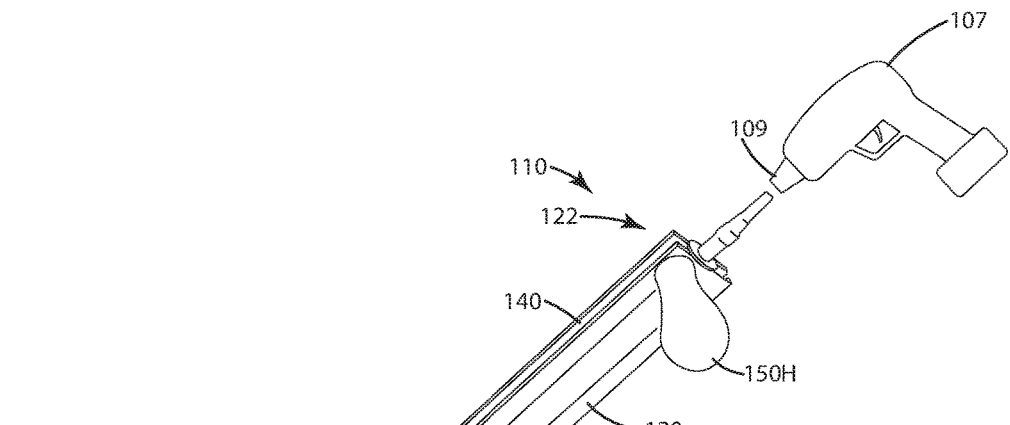
FIG. 21 is a perspective view of a fastener installation tool of a first alternative embodiment.
Figure 26:
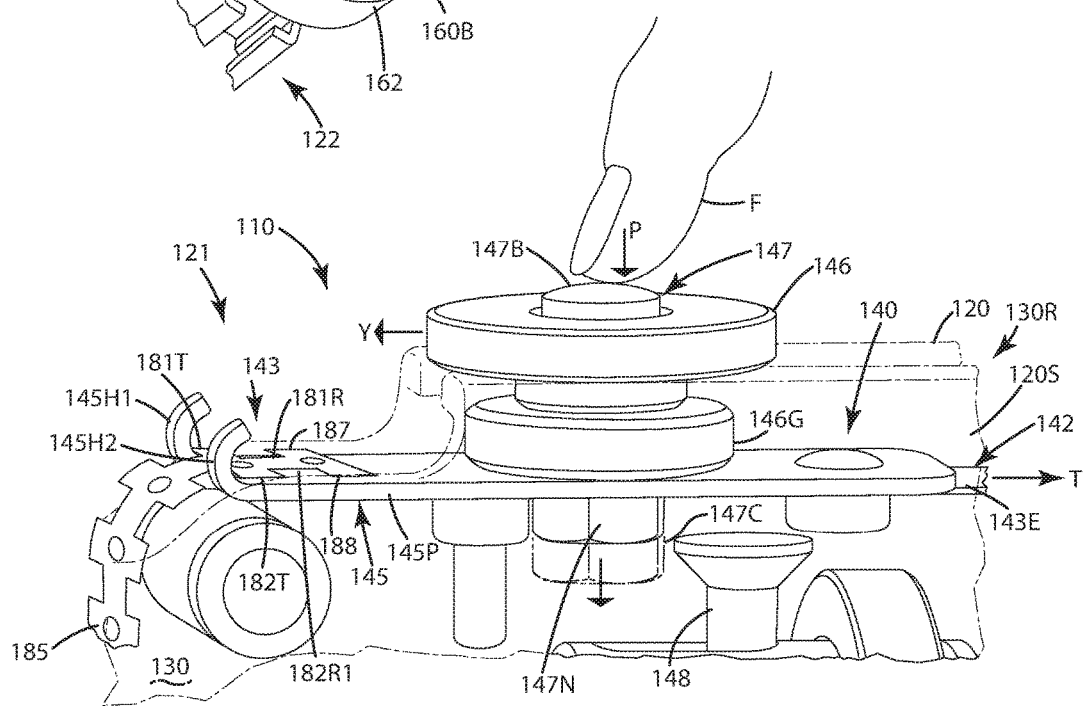
FIG. 26 is a perspective view of a hold button configured to maintain the elongated tension member under tension.
Figure 27:
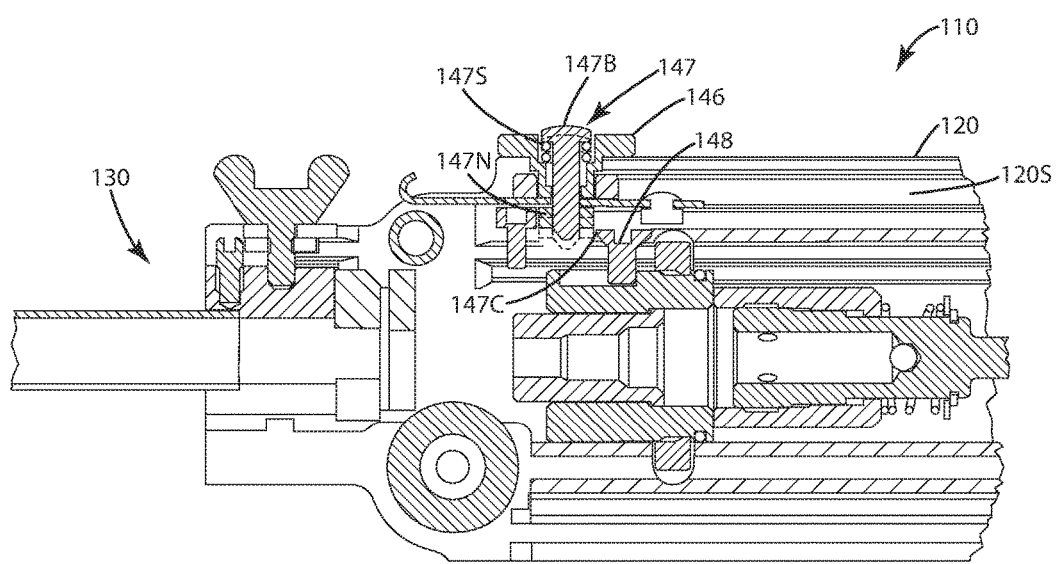
FIG. 27 is a sectional side view of the hold button in operation, holding and releasing the elongated tension member.

As shown in FIGS. 21 and 26-27, the tool 110 can include a tension feeder 140 having a structure, function and operation that is similar to the tension feeder of the embodiment above. In some cases, however, the tension feeder 140 at the attachment element 145 can be modified so as to enable an operator to reload a collated strip of fasteners using both hands. In particular, the feeder 140 can be attached to the strip of collated fasteners 185, as shown in FIG. 26, with an attachment element 145. This strip of collated fasteners can include multiple fasteners joined thereto, similar to the constructions of the strips described above. The strip here, however, can include opposing edges or sides 187 and 188. These edges can respectively define recesses 181R and 182R along the length of the strip or elongated carrier 185. The recesses along the edges can be separated by tabs 181T and 182T. These tabs can be engaged directly by the attachment element 145.

The attachment element 145 can be joined with the end 143 of the elongated member 142. The attachment element can include one or more hooks 145H1 and 145H2. The hooks can be curved like a hook as shown, or alternatively can be angled and/or perpendicular to the plate 145C (more like a pin) of the attachment element 145. The hooks can be spaced a distance from one another so that a portion of the elongated carrier fits therebetween. The hooks can be selectively disposed in the recesses 181R and 182R on opposite sides or edges of the elongated carrier 180. The hooks can directly engage the respective tabs 181T, 182T adjacent the recesses. When the tension feeder pulls on the attachment element 145 and the respective hooks 145H1 and 145H2, those hooks engage the tabs and exert tension on the elongated carrier 180, thereby feeding it through the tool 110 as described in the embodiment above.

The attachment element 145 can include a grasping portion 146 which can enable a user to pull the elongated member 142, in particular its end 143E, away from a roll, like that in the embodiment above, to a position as shown in FIG. 26. The grasping portion 146 can optionally be in a round, doughnut shaped form. The grasping portion 146 can be further joined with a guide element 146G. This guide element 146G can be slidably registered within a slot 120S defined by the frame 120, similar to the construction of the embodiment above. The guide element and the grasping portion 146 can be further attached to plate 145P.

The grasping portion 143 can move on the exterior of the frame adjacent the rear surface 120R of the frame, while the elongated member is disposed in and moves on an interior of the slot 120S. The grasping portion can enable a user to pull the elongated member to a location near the guide, the location being sufficient to join the hooks with the elongated carrier. The grasping portion can include a gripping surface such as a knurled surface if desired.

The attachment element 145 can be pulled to the configuration shown in FIG. 26 via a user manually engaging the grasping portion 146 and moving it toward the guide 130. After the user moves the attachment element 145 to the position shown there, the hooks adjacent the installation end 121 are readied to attach to the carrier strip 185. Optionally, the user can engage a hold element 147 which is associated with the tension feeder, and in particular, the attachment element. This hold element can be configured to retain the elongated member 142 of the tension feeder 140 under tension but temporarily in a fixed, extended position so that the elongated carrier 185 can be joined with the hooks of the attachment element. With this hold element 147 maintaining the attachment element and elongated member in the fixed extended position mechanically, the user can be free to use both hands to attach the carrier strip 185 to the hooks.

As shown in FIGS. 26 and 27, the hold element 147 can include a button 147B that is manually engageable by a finger F of a user. The user can push the button 147B with a force P sufficient to move the button, compress an associated spring 147S, and thereby move an associated extension or nut 147N. Upon this movement of the extension 147 downward, as illustrated in broken lines in FIGS. 26 and 27, the extension 147N is in a position to engage a tension stop 148, which is illustrated in the form of a fastener. The extension 147N engages the tension stop 148 at a point of contact 147C. When the user releases the button 147B, and the extension 147N is in contact with the tension stop 148, the tension T in the elongated member 142 is translated to the attachment element 145 and subsequently the extension 147. This causes the extension 147N to lock against the tension stop 148 thereby preventing the elongated member from pulling or moving substantially the attachment element out from the position shown in FIG. 26.

Accordingly, with the tension feeder so locked, a user can use both hands without having to continue to hold the grasping portion 146 and attach the carrier strip 185. After the carrier strip is installed, the user can pull the grasping portion 146 slightly in direction Y. Due to the spring 147S, the hold element 147 returns to its initial or "up" position so that the extension 147N is no longer aligned with and/or contacting or engaging the tension stop 148. In this manner, the movement of the hold element and thus the attachment element is no longer restricted, so the tension feeder can begin to pull the newly loaded carrier strip 185 under tension T, and the user can operate the tool to install fasteners from the collated carrier 180.

The tool can include a driveshaft that makes the tool suitable for multiple types of drive tools. For example, the drive end of the shaft, that is, the part that is engaged by the drive tool, and in particular a chuck of a tool, such as a drill, can be compatible with multiple types and sizes of drives. Accordingly, regardless of the type of drive tool that the user possesses, that drive tool can be easily joined with the fastener installation tool and put to use.

Figure 22:
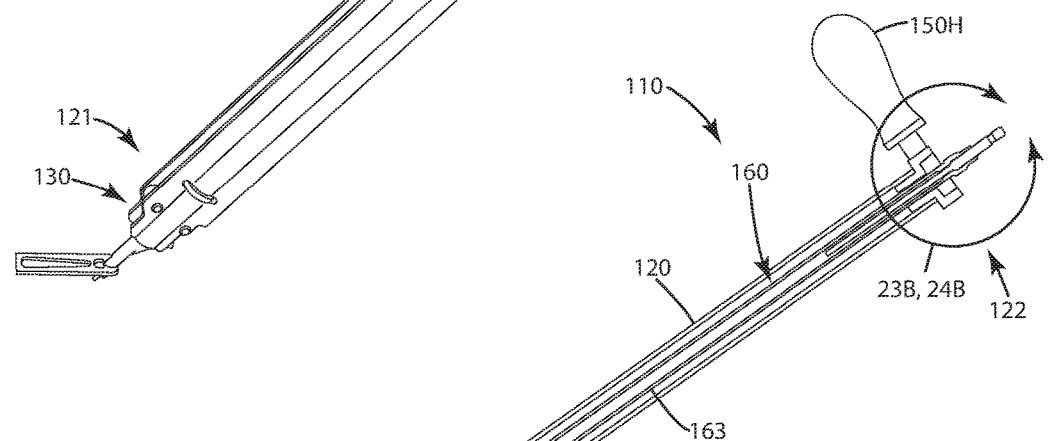
FIG. 22 is a sectional view thereof illustrating a first replaceable drive bit in an installation and a second replaceable drive bit in a drive.
Figure 23:
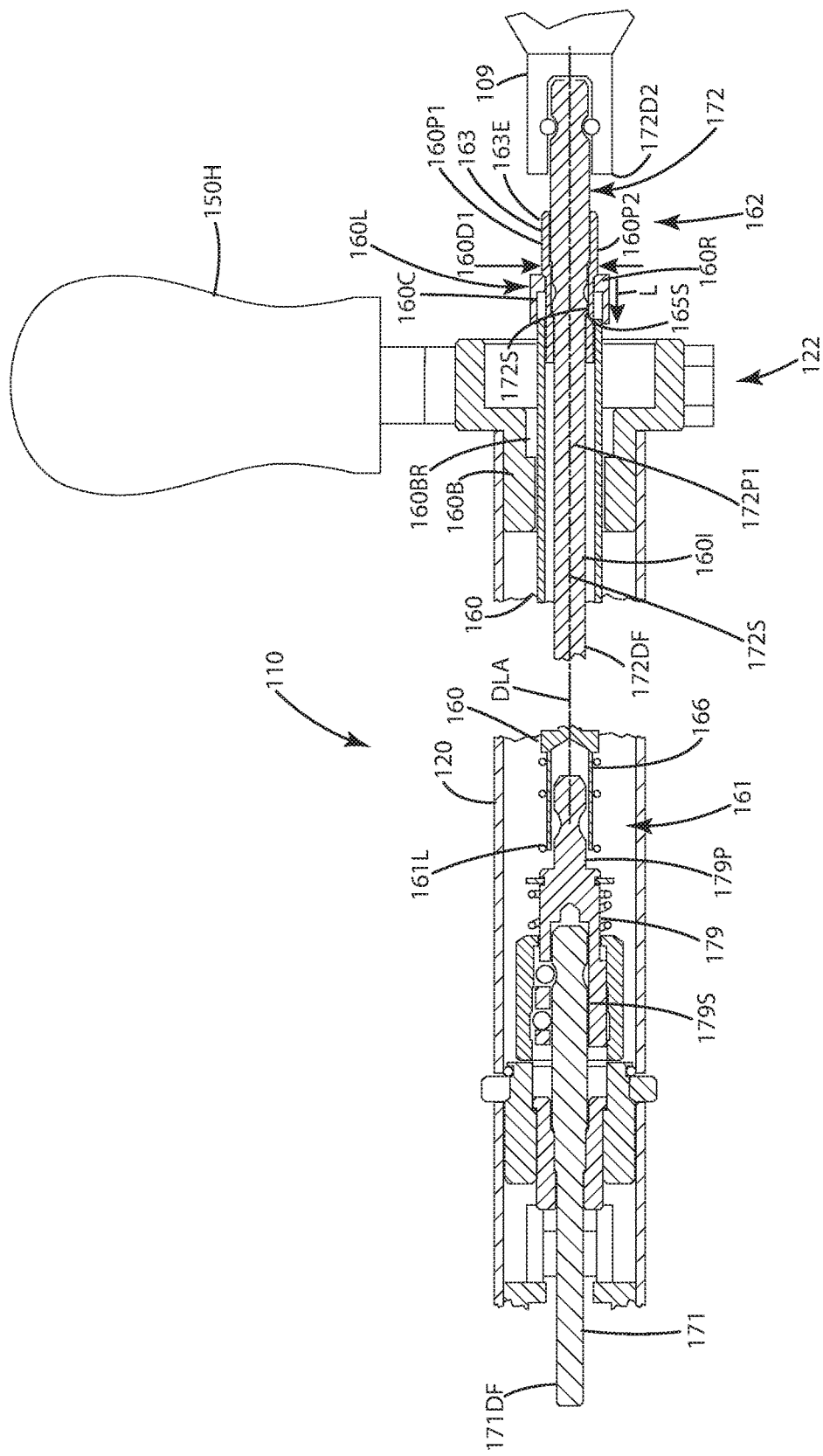
FIG. 23A is a closeup view of the installation end with the first replaceable drive bit installed therein, taken from view 23A of FIG. 22.
FIG. 23B is a closeup view of the drive end with the second replaceable drive bit installed therein, taken from view 23B of FIG. 22.
Figure 24:
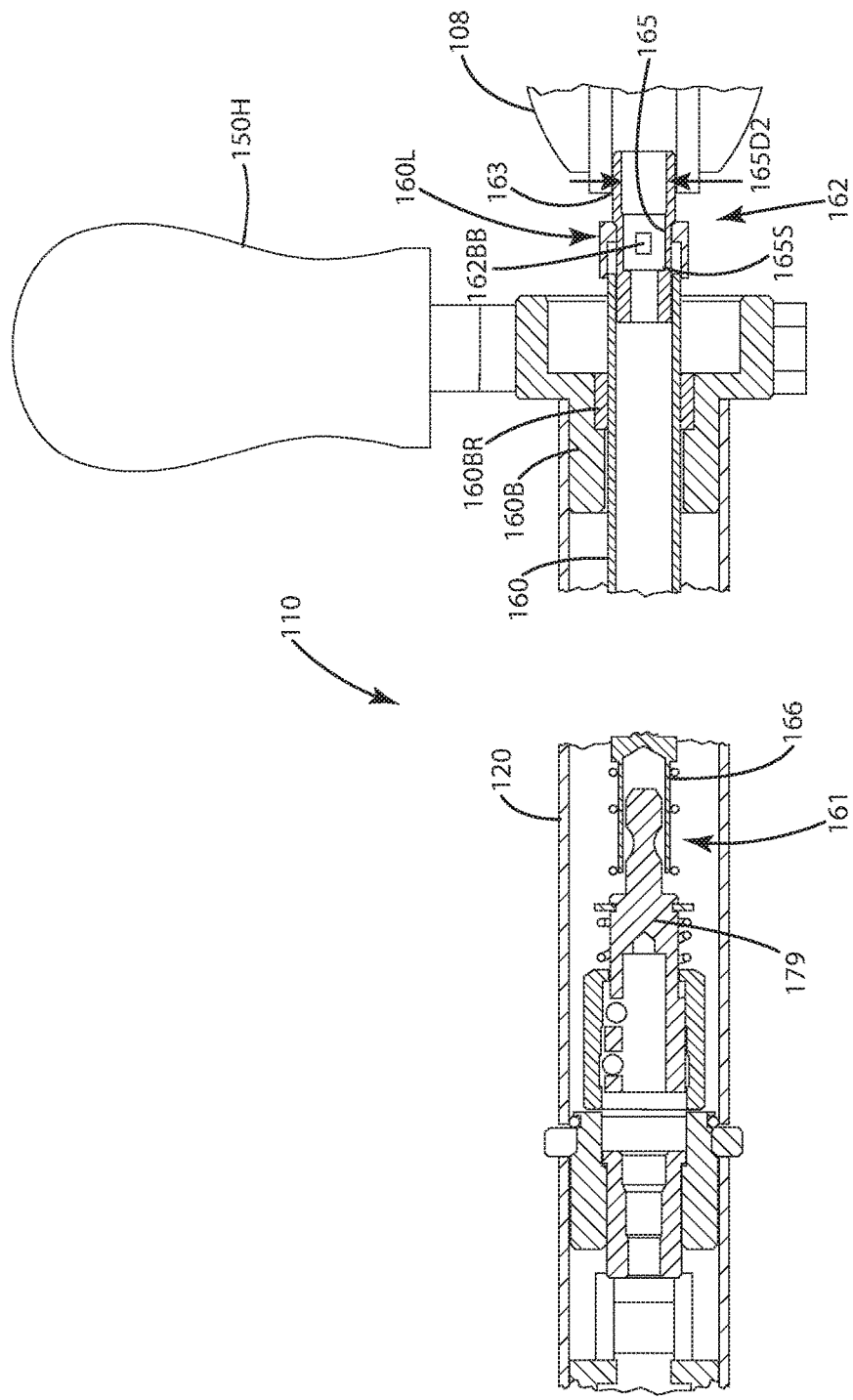
FIG. 24A is a closeup view of the installation end with the first replaceable drive bit removed therefrom, taken from view 24A modified from FIG. 22.
FIG. 24B is a closeup view of the drive end with the second replaceable drive bit removed therefrom taken from view 24B modified from FIG. 22.

As shown in FIGS. 21-23, the tool 110 includes a driveshaft 160 that is rotationally mounted within the frame 120 of the tool 110. The driveshaft can include multiple components that are joined with one another as described in further detail below. Generally the driveshaft 60 can extend through the frame 120 from an installation end 161 to a drive end 162. Optionally the installation end 161 and the central portion 161C of the driveshaft 160 are concealed substantially within the frame 120. In some cases, however holes or apertures can be formed in the frame so that a user can see the driveshaft within it. This, however, might not be suitable for instances where the driveshaft rotates at significant speeds so as to present a safety issue.

As shown in FIGS. 22-23B, the driveshaft 60 can optionally be rotationally constrained in a bushing 160B, that is, fit into the end of the frame 120. This bushing 160P can include bearings 160BR that engage an outer surface of the driveshaft 160. The bushing 160B also optionally can be outfitted so that the handle 150H is attached directly to it rather than the frame 120. Of course, this can be changed with a handle 150H connected directly to the frame 120 instead of the bushing 160B.

The drive end 162 can include a main drill drive attachment body 163, also referred to as a drive attachment body herein. It is at or near this drive attachment body that drive tools of various configurations and sizes can be attached to the driveshaft to impart rotational forces on the driveshaft, thereby rotating the driveshaft and a drive element, for example a first replaceable drive bit 171, which engages a fastener 102 to advance the fastener into the workpiece 100. The drive attachment body 163, as shown in FIG. 23B, extends beyond the upper end 122 of the frame and tool. Optionally, the drive attachment body 163 extends above and beyond the handle 150H. Drive attachment body 163 can extend beyond the handle, the frame and the bushing to an extent sufficient to enable either a chuck 108 of a first drive tool to be joined with the main attachment body 163 directly (FIG. 24B), or a chuck 109 of a second drive tool to be joined with a second replaceable drive bit 172 (FIG. 23B) in the main attachment body 163. Optionally, the chuck 108 of the first drive tool can be a chuck capable of interfacing with and retaining bits of up to ½ inch in diameter or more. Such chucks 108 can be configured to clamp down on the exterior surfaces of drill bits. Many powerful professional grade power drills are configured with such a larger chuck size. Further optionally, the chuck 109 of the second drive tool can be a chuck capable of interfacing with and retaining hexagonal shaped, standardized bits. Accordingly, the chuck 109 can be a simple hexagonal shaped socket that fits over the exposed end of the replaceable drive bit 172. Many lower-power, homeowner grade electric drills and electric screwdrivers can be configured with this smaller chuck size. Again, with the versatility of the tool 110, virtually any chuck size of virtually any rotating drive tool can be utilized with the tool 110.

Figure 25:
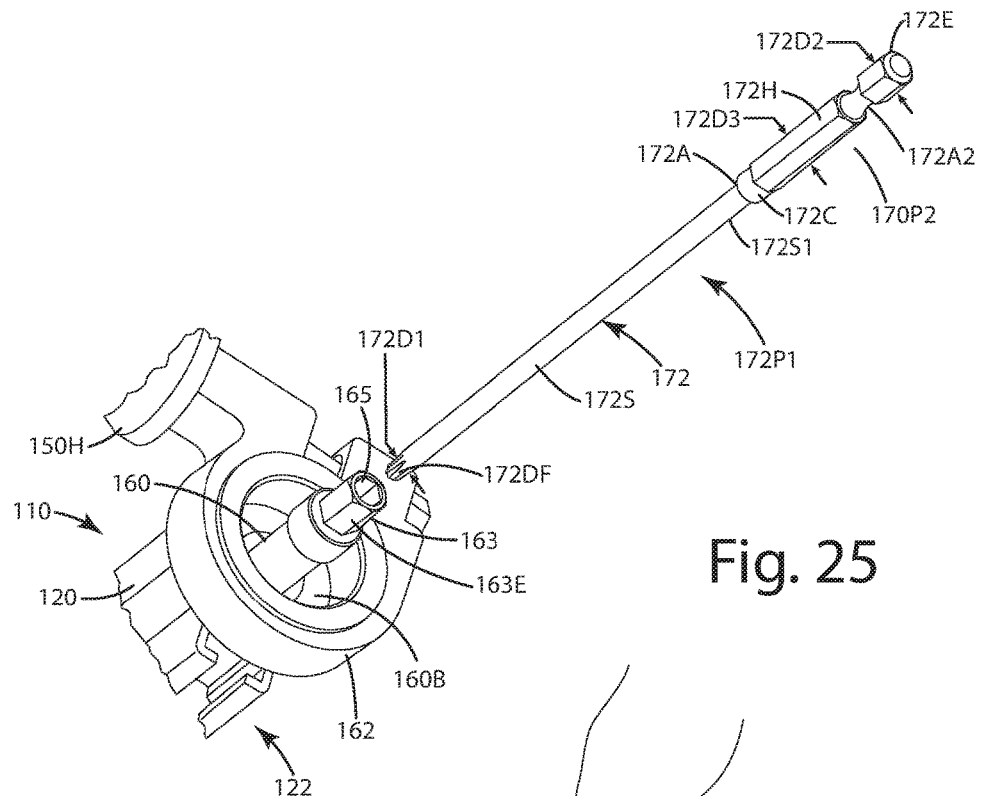
FIG. 25 is a perspective view of the second replaceable bit being removed from the drive end.

The main attachment body 163 can include an exterior surface 163E. It is this exterior surface 163E that can be engaged directly by a chuck 108 of the first drive tool. This outer or exterior surface 163E can be cylindrical or hexagonal shaped as shown in FIG. 25. This exterior surface 163 can include multiple angled facets and/or current facets configured to interface with the corresponding services of the chuck 108 of the first drive tool. Of course other shapes can be selected depending on the particular application and the type of chuck to be used.

The main attachment body 163 optionally can include a first dimension 160D1 measured perpendicular to the longitudinal axis of the driveshaft DLA. The first dimension can be measured diametrically across a width of the main attachment body 163, from a first portion 160P1 of the exterior surface to a second portion of the exterior surface 160P2 that lies directly across the longitudinal axis of the driveshaft DLA. This first dimension 160D1 can be the largest exterior surface of the main attachment body 163 and can be sized to accommodate the chuck 108 of larger drive tools as discussed above.

The main attachment body 163, as shown in FIGS. 23B, 24B and 25 can define a socket 165. The socket can be structured to receive and rotationally restrain replaceable drive bit, for example the second replaceable drive bit 172 shown in FIGS. 23B and 25. Optionally, the socket can be of a hexagonal shape as shown in FIG. 25 so as to correspond to and prevent rotation of a replaceable drive bit 172 having a similarly shaped, hexagonal configuration. The socket 165 can be defined inward from the exterior surface 163E. Optionally, the socket 165 includes a second dimension 165D2 that is taken perpendicular to the longitudinal axis of the driveshaft DLA. The second dimension 165D2 is less than the first dimension 160D1. Likewise a corresponding dimension 172D3 (FIG. 25) of the second replaceable bit 172 is less than this dimension 165D2 of the socket so that the second replaceable bit 172 can fit within the socket 165.

Optionally, the socket 165 can include a projection or a shoulder 165F. This projection or shoulder 165S can be configured to engage another projection or shoulder 172S1 of the second replaceable drive bit 172. When these shoulders engage one another as shown in FIG. 23B, the replaceable bit 172 can no longer be pushed farther into the interior 1601 of the driveshaft 160. The socket as illustrated also can be constructed so that it completely extends through the main attachment body 163. In this manner, the replaceable bit 172 can be inserted into the socket, but it bottoms out against the shoulder 165S of the socket. The shank 172S extends beyond the main attachment body and into the interior 1601 of the driveshaft 160. Indeed, it can extend so far into the driveshaft that the drive feature 172DF of the replaceable bit 172 is located within the interior 1601 of the driveshaft 160. In this manner, the drive feature 172DF and shank 172S of the replaceable drive bit 172 optionally can be concealed within the driveshaft 160 and/or a portion of the main attachment body 163. This is suitable because the drive feature 172S is not utilized for driving any fasteners when installed in this location of the tool. Instead, it can operate merely as an attachment element to enable a chuck 109 to be secured to the driveshaft 160.

With this type of construction, even in cases where the replaceable drive bit 172 has a worn out drive feature 172DF, that drive bit can still operate and/or function as an attachment element to facilitate attachment of the chuck 109 to the driveshaft. Optionally, it is contemplated that either new replaceable drive bits with usable drive features 172DF, that is drive features that are still able to be used to advance fasteners 102, or used replaceable drive bits with worn out drive features 172DF, that is drive features that are unable to be satisfactorily used to advance fasteners 102, can be used as attachment elements. Accordingly, this provides a second use to worn-out replaceable drive bits so they can be further used rather than simply discarded.

Optionally, when the replaceable drive bit 172 is installed in the main attachment body 163, a first portion 172P1 extends into the driveshaft. Again this portion can include the shank 172S and/or the drive feature 172DF. A second portion 172P2 of the replaceable drive bit 172 extends outward, beyond the main drill drive attachment body 163 so that it can be satisfactorily attached to a chuck 109 of a second drive tool. With this configuration, an operator of the fastener installation tool can selectively connect either the chuck 108 of the first drive tool to the exterior surface of the main drill drive attachment body (with corresponding removal of the replaceable drive bit from the main attachment body) or the operator can attach a chuck 109 of a second drive tool to the second portion of the replaceable drive bit 172 that extends outward beyond the main drill drive attachment body (when the replaceable drive bit is installed in the main attachment body), depending on which drive tool is available to the operator.

As shown in FIGS. 23B, 24B and 25, the driveshaft and/or main attachment body can include a locking element 160L. This locking element can be in the form of a locking ring that is slidable along the longitudinal axis DLA to engage and disengage bearings 160BB within an annular recess 172A of the replaceable drive bit 172. The locking element can include a spring 160C, optionally in the form of a coil spring, that is configured to engage the locking ring to a locked mode, as shown in FIG. 23B, in which the bearings 162BB engage the annular recess 172A of the replaceable drive bit 172. In this locked mode, the replaceable bit 172 cannot be easily removed from the socket 165. To remove the replaceable drive bit 172, the locking ring 160R can be moved in direction L, the spring compresses, and the bearings disengage the annular recess 172A, thereby allowing a user to remove the replaceable drive bit 172 from the driveshaft 160. Optionally, other configurations for retaining the replaceable drive bit 172, the main attachment body and driveshaft can be utilized.

As mentioned above, the second replaceable drive bit 172 can be configured to interface particularly with the driveshaft 160. As shown in FIG. 25, the replaceable drive bit 172 can include a shank 172S. The shank extends from a shoulder 172S1 to a drive feature 172DF. The drive feature 172DF can be any of the types of drive features described herein, such as a hexalobular drive feature or other screw drive features. Optionally, the drive feature 172DF can include a dimension 172D1 that is less than the dimension 172D2 of the bit at the opposing end 172E. The bit also can include a partially cylindrical portion 172C that is disposed above the shoulder 172S1. This partially cylindrical portion can define the annular recess 172A, or any type of recess, depending on the application.

Above the cylindrical portion, the second portion 170P2 can include a hexagonal shaped exterior 172H that extends to the end 172E of the bit 172. In this exterior 172H, a second recess, such as a second annular recess 172A2 can be defined. The second annular recess 172A2 is distal from the first annular recess 172A, and closer to the end 172E than the recess 172A. Generally, the first recess 172A can be defined in a portion of the replaceable drive bit 172 that includes a first exterior shape, for example, a cylindrical exterior shape 172C. The second annular recess 172A2 can be defined in a portion of the replaceable drive bit 172 that includes a second exterior shape, for example, an angular or hexagonal exterior shape. Of course, in some applications, the first and second annular recesses can be defined in similarly shaped portions of the replaceable drive bit 172.

As shown in FIGS. 22 and 23A, the driveshaft 160 can be attached to a drive element 179. This drive element 179 can include an attachment portion 179P that fits within a second socket 166 defined by the driveshaft 160 and the installation end 161. The second socket 166 and the portion 179P can be of a cylindrical or multifaceted shape, for example, a cylindrical shape or a hexagonal shape. The drive element 179 can further be joined with a first replaceable drive bit 171, which is configured to engage and advance fasteners with its drive feature 171 DF. Optionally, the drive element 179 can include the first replaceable drive bit 171. A portion of that replaceable drive bit 171 can be disposed within yet another socket 179S defined by the drive element 179. Further optionally, in some cases the drive element can be in the form of the replaceable drive bit 171 by itself, depending on the application. Returning to FIG. 23A, the installation end 161 of the driveshaft 160 can include another locking element 161L. This locking element can operate and can include features similar to that of the locking element 160L at the drive end 162 of the driveshaft.

The method of using the tool 110, and in particular its driveshaft, will now be described. Generally, fastener installation tool 110 can include a guide 130 defining a bore, optionally attached to a frame 120. A driveshaft 160 is rotationally mounted in the frame. The driveshaft can include the installation end 161 and a drive end 162 distal from the installation end. The drive end can include the main drill drive attachment body 163 as described above.

The first replaceable bit can be installed adjacent or in the installation end 161 of the driveshaft 160. This can include installing the replaceable bit directly in the installation end 161 of the driveshaft 160. Optionally, it can include installing a separate drive element 179 and its respective portion 179P in the installation end 161, the driveshaft 160, and additionally installing the replaceable drive bit 171 and the socket 179S or some other connection of the drive element 179.

A user can install a chuck 108 of the first drive tool on the main attachment body 163 and its exterior, then secure these elements to one another. The user can then engage the drive tool such that the chuck 108 rotates under power, thereby rotating the driveshaft 160 and the first replaceable drive bit 171 to advance a fastener through a bore of the guide with the first replaceable bit 171. In this operation, as described in the embodiment above, a strip of collated fasteners 185 or an elongated carrier can be moved along a collated fastener path CFP past the guide with a feeder 140.

The method can include installing the second replaceable bit 172 in the socket 165 defined by the main drill drive attachment body 163. When installed, as mentioned above, the shank shoulder 172S1 of the replaceable drive bit 172 is disposed within and optionally concealed within the driveshaft 160. Further optionally, the replaceable bit can be either a usable bit or a worn-out bit. In each respective case, the usable drive feature or worn out drive feature can be disposed within at least a portion of the driveshaft 160 and generally inaccessible therein. The second portion 172P2 of the replaceable drive bit 172, which is still usable, can extend from the main drill drive attachment body and its end 163E.

In another step, a chuck 109 of a drive tool, shown in FIG. 23B, is joined with the second portion of the replaceable bit 172. The replaceable bit 172 is rotated, which in turn causes the driveshaft 160 to rotate, which in turn causes the first replaceable bit 171 to rotate, and advance a fastener through a bore of the guide 130 with the first replaceable bit, thereby installing the fastener.

If desired, worn-out bits can be recycled for alternative uses and to serve a different function with the tool. For example, after the first replaceable bit 171 is worn out, it can be removed from the installation end, whether this is by taking the bit out of the driveshaft or the drive element. The installation end, with the first replaceable bit removed from the drive element 179, is illustrated in FIG. 24A. The second replaceable bit can be removed from the drive end. The second replaceable bit 172 being removed from the drive end 162 is illustrated in FIG. 25. The first replaceable bit then can be installed in the socket 165 at the drive end 162. Yet a third replaceable drive bit, optionally new or generally usable, can be installed at the installation end 161, and optionally joined the drive element 179.

The method optionally can include changing one drive tool for another. For example, after advancing fasteners with the tool 110 joined with a chuck 109 of the first tool, that chuck can be removed from the second replaceable bit 172. The second replaceable bit can be removed from the drive end 162. A second drive tool, optionally with a larger chuck 108 can be joined with the main drill attachment body 163, and in particular its exterior surface 163E, so the second drive tool can rotate the driveshaft and conduct fastener installation operations.

The first alternative embodiment of the tool 110 also can be configured to include and receive replaceable guides. Such guides can be constructed to install specific types of fasteners. For example, some guides of the embodiment can be constructed to install long screws in flat-faced surfaces. Other guides can be constructed to install short screws in flat-faced surfaces, yet other guides can be constructed to install screws in tongue and groove or porch boards. Yet other guides can be constructed to install screws at an angle through a corner or side face of a board to fasten it to an underlying surface in a hidden manner.

Figure 28:
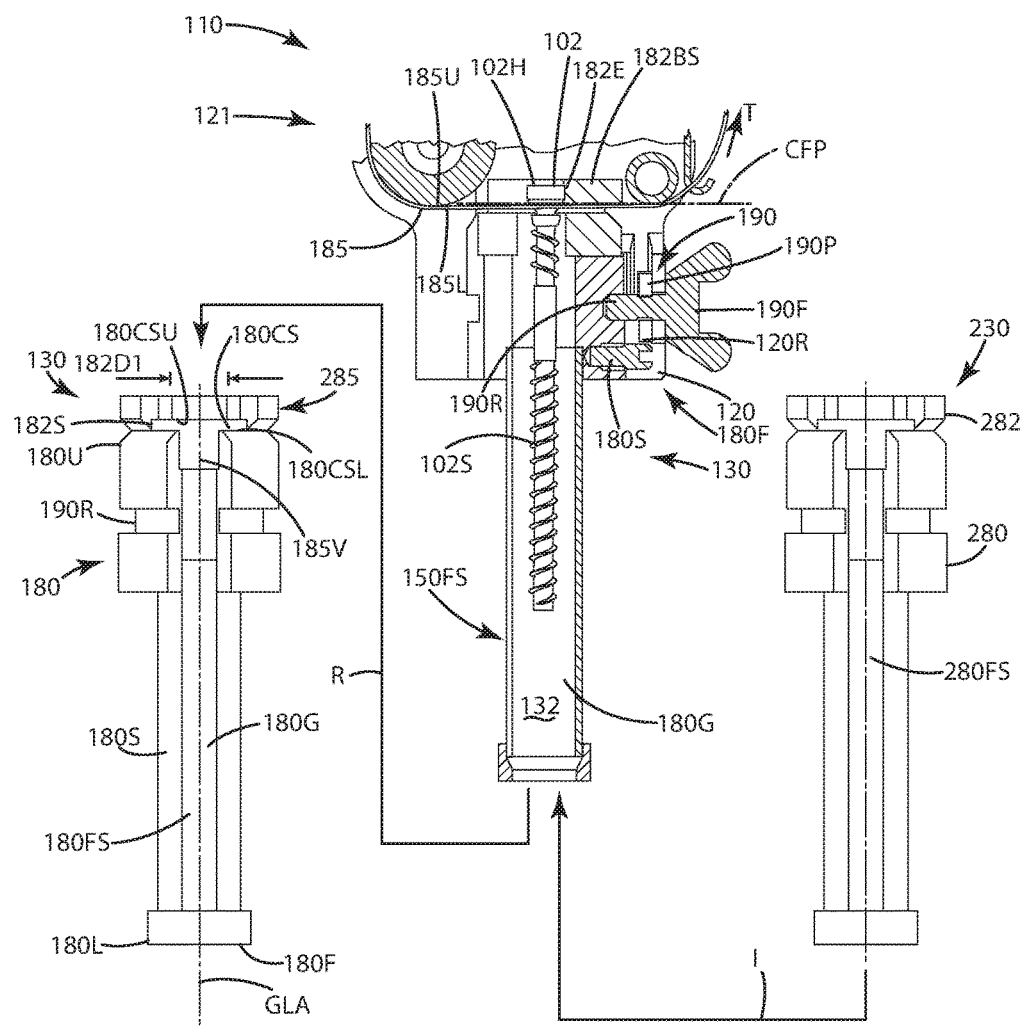
FIG. 28 is a sectional view of a first replaceable guide being exchanged for a second replaceable guide relative to the tool.

As shown in FIG. 28, a replaceable, removable guide 130 can be installed at the installation end 121 of the tool 110. This particular guide 130 can be constructed to install long screws in flat-faced surfaces. This guide 130 can include a guide body 180 having an upper end 180U and a lower end 180L. The lower end 180L can include a flat foot 180F that is configured to engage flat-faced surfaces. The guide body can include a longitudinal axis GLA. The guide body 180 can define a guide bore 132 that is configured to guide a rotating fastener, as with the embodiment above. The guide bore can optionally be centered on the longitudinal axis GLA. The guide bore can be bounded on the interior by at least one guide wall 180G that generally assists in guiding and/or engaging the fastener 102 as it is advanced and/or fed in the guide bore. The guide bore also can be bounded by a sidewall 180S of the guide body 180. The sidewall can transition to the guide wall from the exterior to the interior of the body 180. The sidewall can define a feed slot 180FS that can be configured so a shank of a fastener 102S can move toward the longitudinal axis and/or generally enter the bore 132 through that feed slot 180FS as the fastener is advanced by a feeder of the tool 110 as described above. As shown in FIG. 28, the feed slot 180FS can extend from generally below a carrier slot 180CS to the foot 180F. The feed slot optionally can be of the same shape and dimension (length) as the fasteners 102 to be fed into the bore to provide adequate clearance for the same.

The replaceable guide 130 can include a guide head 182. This guide head can be joined with a guide body 180 at the upper end 180U of the guide body. Optionally, the guide head 182 can be integrally formed and monolithic with the guide body 180. In this case, the guide body and guide head are integral with one another to form a single piece guide unit. As described further below, a carrier slot 180CS can be defined through the single piece guide unit in at least one of the guide body and the guide head. The guide head 182 is generally disposed above the guide bore 132, and above the guide wall and sidewall of the guide body 180. Optionally, the guide body and guide head can be screwed or fastened to one another.

The guide head 182 can be constructed to accommodate fasteners of varying sizes to provide an adequate amount of tilt to those fasteners relative to the guide bore and/or guide walls and install them appropriately. For example, the dimension 182D1 of the opening in the head 182 into which the fasteners received can be sized so that it is slightly larger than a head 102H of the fastener 102 with which the guide is compatible. The size can vary depending on the size of the screw head. For example, for small screws, the opening can be small and for large screws the opening can be large.

The head 182 optionally can include a backstop or fastener stop 182BS attached thereto and/or integral therewith. This backstop can operate similar to the backstops described above with the current embodiment and therefore will not be described again here. Suffice it to say that the backstop is configured to engage ahead of a fastener to facilitate tilting of the shank 102S against the guide wall 180G so as to align the fastener with the guide bore satisfactorily. The backstop 180BS of this embodiment however goes with the guide. In this manner, guides with specific utility backstops can be installed, so that no further adjustment for the guide is needed.

Another feature of the replaceable guides is the carrier slot 180CS. The carrier slot 180CS is built into the each replaceable guide and forms the area or region through which a carrier 185 or strip of collated fasteners travels along the collated fastener path CFP as a feeder pulls the strip under tension T through the guide 130. The carrier slot can be dimensioned to slidably receive the collated fastener carrier 185 of whatever size, thickness or width desired. The carrier slot can be located between the head and the body of the guide. The carrier slot 180CS can be transverse to the longitudinal axis GLA of the guide. The carrier slot 180CS also can be located generally under or adjacent the head 182, sufficiently close to the backstop 182BS so that the head 102H of a fastener collides with the backstop 182BS to provide a tilting action to the shank 102S as described above. Optionally, the carrier slot 180CS is defined below the backstop and above the feed slot of the guide.

The carrier slot 180CS can be bounded by an upper surface 180CSU and a lower surface 180CSL. The lower surface 180CSL can be constructed to engage a lower surface 185L of the carrier strip 185, while the upper surface 185CSU can be configured to engage an upper surface 185U of the carrier strip 185. The lower surface 185CSL, however can be interrupted by a void 185V as it extends across the longitudinal axis GLA. The upper surface 185CSU, however, can include a surface that extends completely across the longitudinal axis GLA from one side to the opposing side. The upper surface of the carrier slot also can transition to the engagement surface 182E of the backstop 182BS. The carrier slot further can include sidewalls 182S that form the sides of the carrier slot and extend from the upper surface to the lower surface of the carrier slot. Optionally, where the tool or guide is configured to feed a collated strip such as the one in FIGS. 20A-20B, the void 185V can be absent from the carrier slot, so that the lower surface of the carrier slot 185CSL extends completely across the longitudinal axis GLA from one side to the opposing side of the slot. This is because the collated strip there is flat, and without projections or cups extending out from the bottom surface of that strip. With the void removed, in some cases, there can be less likelihood that a head of a fastener is pulled under tension force into the void, thereby causing an improper feed of the fastener into the bore.

In some applications, the guide 130 can include an alignment feature 180F. This alignment feature can enable precise and consistent registration of the guide with the frame 120. The alignment feature can include a recess 120R as defined by the frame 120. The guide 130 can include a setscrew 180ES. The setscrew can be located so as to register precisely in the recess 120R so that the guide does not rotate therein or relative to the frame. Further optionally, the setscrew can be replaced for some other type of alignment feature, such as a projection, depending on the application.

To join the replaceable guide 130 with the lower end 121 of the tool 110, a locking member 190 can be utilized as shown in FIG. 28. The locking member can include a recess 190R that is defined by the guide 130. The recess 190R can be defined by the guide body 180 as shown, but of course, in other cases, the recess can be formed in the guide head 182, or it can overlap both. The locking member can include a fastener 190F that is joined with a portion of the frame 120. The fastener 190F can be threaded into a plate 190P and can extend into the recess 190R. The fastener 190F can be tightened sufficiently to lockably and sturdily secure the replaceable guide 130 to the frame 120.

With this construction, the fastener 190F can be loosened to quickly replace one guide for another. For example, as shown in FIG. 28, the guide 130 can be removed as shown via arrow R from the end of the tool 110. In its place, another replaceable guide 230 can be installed via arrow I in the end 121 of the tool 110. Optionally, this replaceable guide can be the same type of guide or a different type of guide when a different type of screw or application is in order. As a further example, a user may use the guide 130 to install long screws, flat-faced into thicker decking. At some point, the boards of the decking may be thinner. In this case, a user can remove the guide 130 in direction R and replace it with a short screw guide 230 installed in direction I in the tool. This short screw guide 230 can include a shorter feed slot 280F to accommodate the shorter screws.

Figures 29, 30:
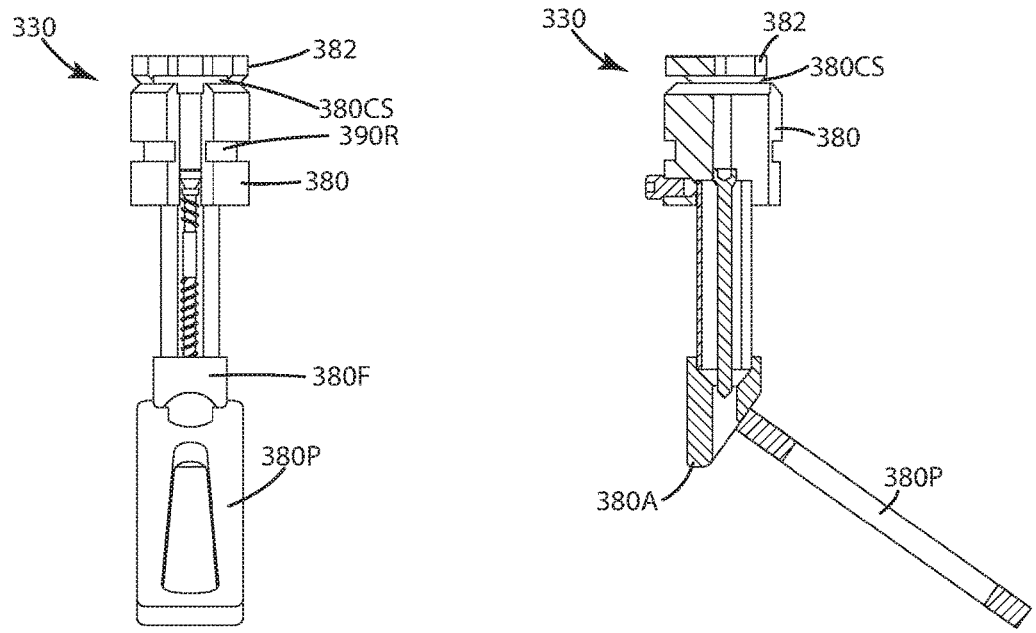
FIG. 29 is a front view of a third replaceable guide.
FIG. 30 is a side sectional view of the third replaceable guide.
Figure 31:
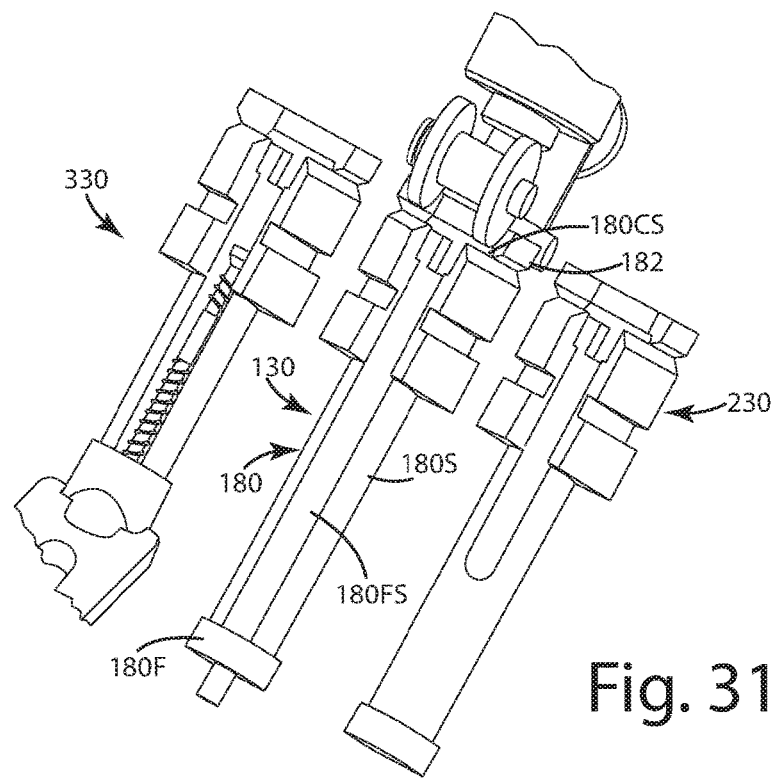
FIG. 31 is a perspective view of the first, second and third replaceable guides.

A variety of different types of replaceable guides can be used in connection with the tool as shown in FIGS. 28-31. Another type of replaceable guide 330 is shown in FIGS. 29-31. This replacement guide includes the head 382 and body 380 as described above, as well as the carrier slot 380CS and the locking member recess 390R. The foot 380F of this guide however can be configured to include an alignment projection 380A and a positioning plate 380P. With this construction, the replaceable guide 330 can be used to install fasteners within a crevice between workpieces, such as boards where no gap is established between those workpieces upon installation or thereafter. The alignment projection and the plate can be similar to those described in the embodiments above is desired.

Other statements that may be helpful in understanding the embodiments herein can include the following:

S1. A method of installing a fastener in a workpiece comprising:
pulling on a strip of collated fasteners at a location downstream of a guide defining a bore, the strip including a carrier and a plurality of fasteners;
advancing a first fastener from the plurality of fasteners through the bore and into a workpiece.

S2. The method of statement S1 wherein the guide includes a head size adjuster element adapted to interface with a backstop corresponding to a first fastener head size, comprising engaging the head size adjuster element with the backstop so that a drive element aligns with a drive feature of the first fastener.

S3. The method of statement S2 comprising sliding the backstop away from an axis of the bore during the engaging step.

S4. The method of statement S2 comprising sliding or moving the backstop away from an axis of the bore during the engaging step.

S5. The method of statement S1 comprising:
removing the guide from a frame, the guide being a first guide having a first bore of a first diameter;
replacing a second guide in the frame in place of the first guide, the second guide having a second bore of a second diameter larger than the first diameter.

S6. The method of statement S1 comprising adjusting a backstop associated with the guide so that the guide can guide a second fastener having a different diameter head than a head of the first fastener.

S7. The method of statement S1 comprising passively supporting the carrier upstream of the guide.

S8. The method of statement S7 comprising providing a channel adjacent a frame to which the guide is joined, the channel being of a width to enable the carrier to slide longitudinally through the channel during the pulling step.

S9. The method of statement S1 comprising adjusting a depth of drive of the installation tool to accommodate a plurality of fasteners having a plurality of preselected driving depths.

S10. The method of statement S1 comprising providing a frame, the frame having a drive rod extending from adjacent the guide past a drive tool end, and adjusting in the drive tool end a tool stop to selectively arrest movement of the drive tool toward the guide.

S11. The method of statement S10 wherein the frame is joined with a handle, wherein the handle is connected to the tool stop, comprising rotating the handle to selectively move the tool stop relative to the drive tool end so that a drive element joined with the frame only extends past the nose a preselected distance.

S12. The method of statement S10 comprising providing a tension feeder that includes an elongate member adapted to coil retractably into an elongate member roll, wherein the tension feeder includes a hook configured to attach to a leading end of the strip.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A method of installing a fastener in a workpiece comprising:
pulling on a strip of collated fasteners at a location downstream of a guide defining a bore, the strip including a carrier and a plurality of fasteners;
advancing a first fastener from the plurality of fasteners through the bore and into a workpiece; and
attaching a tension feeder to only a leading end of the carrier so that the tension feeder can pull on the carrier at only the leading end of the carrier at the location downstream of the guide,
wherein a trailing end of the carrier remains upstream of the guide during the pulling step;
wherein a portion of the carrier between the trailing end and the guide is under no tension during the pulling step and during the advancing step,
wherein the tension feeder remains attached to the leading end of the carrier until the trailing end is adjacent the guide.

2. The method of claim 1 comprising:
aligning the first fastener with the bore by engaging a head of the first fastener against a backstop of the guide and pulling on a shank of the first fastener with the carrier so that a tip of the first fastener swings into alignment with the bore.

3. The method of claim 1 comprising:
applying no force, from any location upstream of the guide, to the strip such that the strip is only moved via the pulling on the strip at the location downstream of the guide.

4. The method of claim 1 comprising:
securing a tension feeder to the carrier at only a leading end of the strip so that the tension feeder moves with the leading end; and
passively guiding a trailing end of the carrier upstream of the guide.

5. The method of claim 4,
wherein the carrier includes a leading edge and a trailing edge, and a downstream portion located downstream of the bore, and an upstream portion located upstream of the bore,
wherein the tension feeder is joined with the carrier near the leading edge,
wherein the tension feeder performs the pulling step,
wherein the tension feeder is the only part of the tool that moves the carrier past the bore,
wherein the carrier includes right and left sides,
wherein the right and left sides are void of notches along a continuous majority of a length of the carrier.

6. A method of installing a fastener in a workpiece comprising:
pulling on a strip of collated fasteners at a location downstream of a guide defining a bore, the strip including a carrier and a plurality of fasteners;
advancing a first fastener from the plurality of fasteners through the bore and into a workpiece;
attaching a leading end of the carrier at a location downstream of the guide to an elongated member; and
rolling the elongated member onto itself to form an elongated member roll; wherein a trailing end of the carrier remains upstream of the guide during the pulling step; wherein a portion of the carrier between the trailing end and the guide is under no tension during the pulling step and during the advancing step.

7. The method of claim 6,
wherein the elongated member is joined with a tensioner spring,
wherein the tensioner spring retracts the elongated member toward the tensioner spring.

* * * * *